(12) United States Patent
Sato et al.

(10) Patent No.: US 9,744,854 B2
(45) Date of Patent: Aug. 29, 2017

(54) OPERATION AMOUNT DISPLAY APPARATUS

(71) Applicant: HONDA MOTOR CO., LTD., Minato-ku, Tokyo (JP)

(72) Inventors: Yoshikazu Sato, Wako (JP); Go Suzaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/105,779

(22) PCT Filed: Dec. 4, 2014

(86) PCT No.: PCT/JP2014/082156
§ 371 (c)(1),
(2) Date: Jun. 17, 2016

(87) PCT Pub. No.: WO2015/093305
PCT Pub. Date: Jun. 25, 2015

(65) Prior Publication Data
US 2016/0318396 A1 Nov. 3, 2016

(30) Foreign Application Priority Data
Dec. 18, 2013 (JP) .................................. 2013-261575

(51) Int. Cl.
*B60K 35/00* (2006.01)
*B60K 26/02* (2006.01)
(Continued)

(52) U.S. Cl.
CPC ............ *B60K 35/00* (2013.01); *B60K 26/021* (2013.01); *B60T 7/02* (2013.01); *B60T 7/042* (2013.01);
(Continued)

(58) Field of Classification Search
CPC ............ B60K 26/021; B60K 2026/022; B60K 2026/023; B60K 2350/10;
(Continued)

(56) References Cited

U.S. PATENT DOCUMENTS

2002/0161487 A1 10/2002 Kojima et al.
2009/0251304 A1 10/2009 Saito et al.
(Continued)

FOREIGN PATENT DOCUMENTS

WO 2008/050741 A1 5/2008

*Primary Examiner* — Andrew Bee
(74) *Attorney, Agent, or Firm* — Carrier Blackman & Associates, P.C.; Joseph P. Carrier; William D. Blackman

(57) ABSTRACT

A pedal operation amount display apparatus includes: a display device that is configured to display an accelerator operation amount of an accelerator pedal by an operating person by means of light emission of segments; and an assist reaction force calculation part that is configured to set a threshold operation amount as a target value of the accelerator operation amount; and a display control part that is configured to control the display device in a manner such that the accelerator operation amount corresponding to the threshold operation amount is constantly displayed by means of light emission of the segments. Even when the threshold operation amount is changed, the display control part keeps the light emission of the segments unchanged until the accelerator operation amount varies.

14 Claims, 9 Drawing Sheets

(51) Int. Cl.
  *B60T 7/02*   (2006.01)
  *B60T 7/06*   (2006.01)
  *G05G 1/30*   (2008.04)
  *B60T 7/04*   (2006.01)
  *B60T 17/22*  (2006.01)
  *G01D 7/04*   (2006.01)

(52) U.S. Cl.
  CPC ............ *B60T 7/06* (2013.01); *B60T 17/22* (2013.01); *G01D 7/04* (2013.01); *G05G 1/30* (2013.01); *B60K 2350/1096* (2013.01); *B60K 2350/908* (2013.01)

(58) Field of Classification Search
  CPC .... B60K 2350/1004; B60K 2350/1076; B60K 2350/1096; B60W 50/08; B60W 50/14; B60W 50/16; B60W 2540/00; B60W 2540/10; B60W 2540/103; G05G 1/40; F02D 11/105; Y10T 74/20534
  See application file for complete search history.

(56) References Cited

U.S. PATENT DOCUMENTS

| | | | |
|---|---|---|---|
| 2009/0288636 A1* | 11/2009 | Saito | B60W 50/14 123/399 |
| 2013/0038439 A1 | 2/2013 | Saito | |
| 2013/0120126 A1 | 5/2013 | Fuke et al. | |
| 2014/0129099 A1* | 5/2014 | Fuke | F02D 29/02 701/51 |
| 2014/0138172 A1 | 5/2014 | Suzuki et al. | |
| 2016/0259362 A1* | 9/2016 | Suzaki | B60K 26/04 |

\* cited by examiner

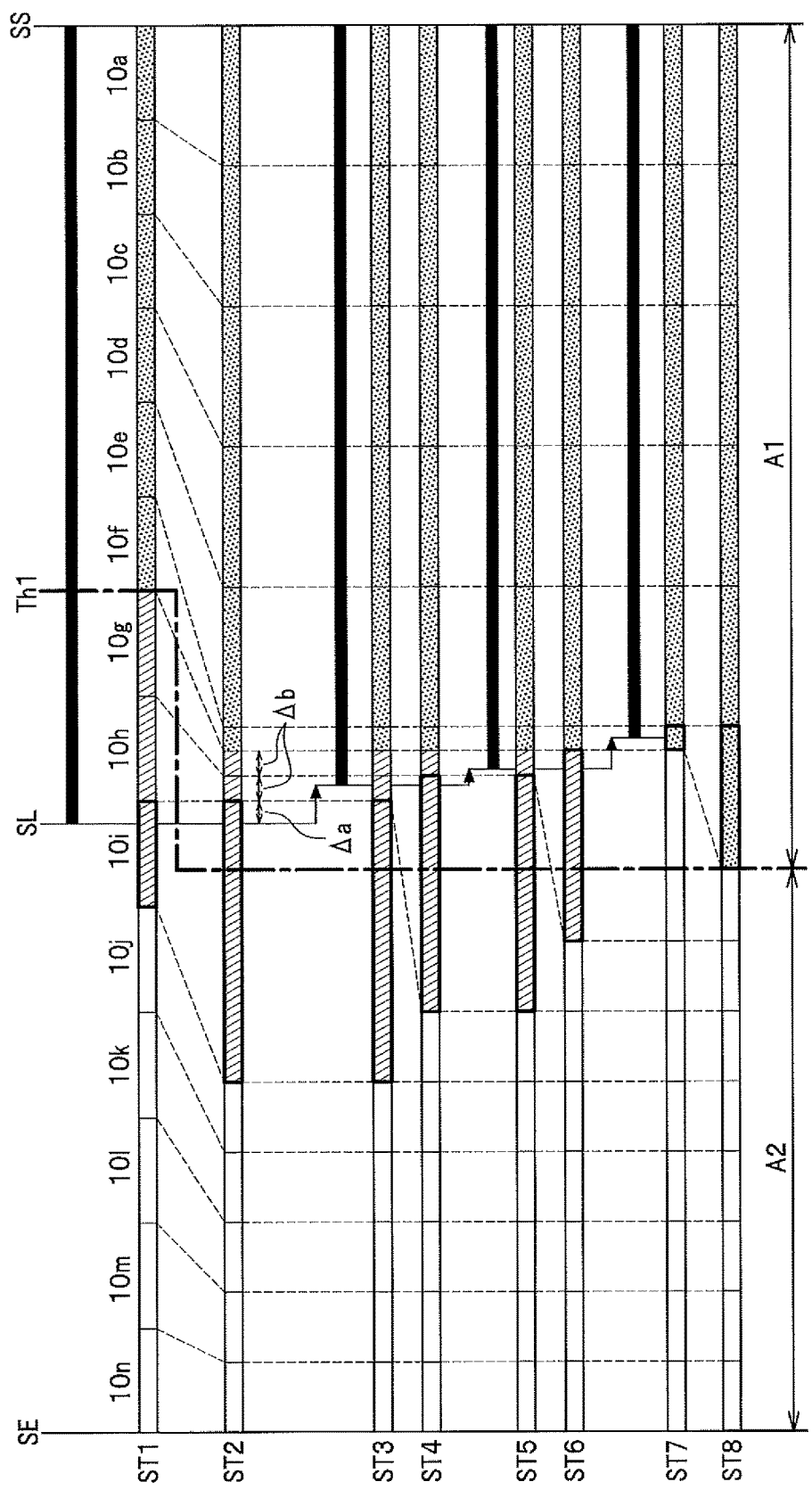

though the target value is changed, the ratio of the operation amount display position to the target display position has inherent discrepancy. Even in that case, when the operator is operated, the operation amount display position is changed such that the discrepancy is eliminated. This can reduce a sense of something odd felt by the driver.

OPERATION AMOUNT DISPLAY APPARATUS

CROSS REFERENCE TO RELATED APPLICATION

This application is a National Stage Application of PCT/JP2014/082156, filed on Dec. 4, 2014, and which application is incorporated herein by reference. To the extent appropriate, a claim of priority is made to the above disclosed application.

BACKGROUND OF THE INVENTION

1. Field of the Invention

The present invention relates to an operation amount display apparatus which displays an operation state of a pedal.

2. Description of the Related Art

PCT International Publication No. WO 2008/050741 (which may also be referred to as Patent Document 1) discloses a device for displaying an accelerator opening degree (a device for displaying accelerator opening degree). The device for displaying accelerator opening degree constantly displays a target opening degree display value as a predetermined value, independent of a target accelerator opening degree.

Patent Document 1: PCT International Publication No. WO 2008/050741

The device for displaying accelerator opening degree disclosed in Patent Document 1 displays a target opening degree display value as a predetermined value. When the target opening degree display value varies, even if the accelerator opening degree remains unchanged, how the accelerator opening degree is displayed changes. Because the device for displaying accelerator opening degree is used for displaying an opening degree, there is a problem that a driver feels a sense of something odd, if the display of the opening degree changes even when the opening degree remains unchanged.

In light of the problem described above, the present invention has been made in an attempt to provide an operation amount display apparatus which can display an operation amount of an operator without giving a driver a sense of something odd.

SUMMARY OF THE INVENTION

According to a first aspect of the present invention, an operation amount display apparatus includes: an information display part that is configured to display an operation amount of an operator by an operating person; and a setting part that is configured to set a target value of the operation amount. The information display part: sets a prescribed target display position which indicates the target value; converts the operation amount into an operation amount display position; and variably displays the operation amount display position, using the target display position as a reference. When the target value is changed, the information display part keeps the operation amount display position unchanged until the operation amount is changed.

According to the first aspect of the present invention, the operation amount of the operator is converted into the operation amount display position and is variably displayed, based on a prescribed target display position indicating a target value. This makes it easy for a driver to recognize a positional relationship between the operation amount and the target value. Further, while the operation amount of the operator remains unchanged, even when the target value is changed, the operation amount display position is displayed unchanged. This makes it possible to avoid a problem that, even when the driver does not operate the operator, the displayed operation amount display position changes. A sense of something odd felt by the driver can be thus reduced.

According to a second aspect of the present invention, when the target value is changed and the operation amount is then also changed, the information display part converts the operation amount into the operation amount display position such that a ratio of the operation amount display position to the target display position becomes closer to a ratio of the operation amount to the target value.

According to the second aspect of the present invention, the display is changed only after the driver operates the operator. This can reduce a sense of something odd felt by the driver. Further, the operation amount display position is changed such that the ratio of the operation amount display position to the target display position becomes closer to the ratio (an original ratio) of the operation amount to the target value, in response to a variation in the operation amount of the operator. Let us assume a case in which, when the operation amount display position remains unchanged though the target value is changed, the ratio of the operation amount display position to the target display position has inherent discrepancy. Even in that case, when the operator is operated, the operation amount display position is changed such that the discrepancy is eliminated. This can reduce a sense of something odd felt by the driver.

According to a third aspect of the present invention, when the target value is changed and the operation amount is then also changed, and also when the operation amount varies in a direction in which the ratio of the operation amount display position to the target display position becomes closer to the ratio of the operation amount to the target value, the information display part changes the operation amount display position, with a variation in the operation amount smaller than that when the operation amount varies in a direction opposite to the direction.

When only the target value is changed, and the operation amount of the operator remains unchanged, there is a discrepancy in the ratio of the operation amount display position to the target display position, compared to an actual ratio, because the operation amount display position is not changed. Thus, when the operation amount varies in the direction in which the ratio of the operation amount display position to the target display position becomes closer to the actual ratio, the operation amount display position is made to change with a variation of the operation amount smaller than that when the operation amount varies in the opposite direction. This makes it possible for the operation amount display position to be quickly changed, when the operation amount varies in the direction in which the ratio of the operation amount display position to the target display position becomes closer to the original operation amount. In contrast, when the operation amount varies in a direction in which the ratio of the operation amount display position to the target display position becomes farther away from the original operation amount, a rapid change in the operation amount display position is prevented.

According to a fourth aspect of the present invention, the information display part: displays the operation amount in a form of a plurality of segments obtained by dividing the operation amount; shifts a peak segment in accordance with a variation in the operation amount, the peak segment being one of a plurality of the segments and indicating the operation amount display position; and changes a variation in the operation amount based on which the peak segment is shifted, in response to at least one of a change in the target value and a variation in the operation amount.

According to the fourth aspect of the present invention, the information display part includes a plurality of segments for displaying the operation amount, one of which becomes a peak segment indicating the operation amount display position. The peak segment shifts in accordance with a change in the operation amount display position. A variation in the operation amount based on which the peak segment is shifted varies, in response to at least one of a change in the target value and a variation in the operation amount.

According to a fifth aspect of the present invention, when the target value is changed, and also when the operation amount varies in the direction in which the ratio of the operation amount display position to the target display position becomes closer to the ratio of the operation amount to the target value, the information display part shifts the peak segment, with a variation in the operation amount smaller than that when the operation amount varies in the opposite direction.

According to the fifth aspect of the present invention, when the operation amount varies in the direction in which the ratio of the operation amount display position to the target display position becomes closer to the actual ratio, the peak segment shifts quickly. In contrast, when the operation amount varies in the direction in which the ratio of the operation amount display position to the target display position becomes farther away from the actual ratio, the peak segment shifts moderately.

According to aسixth aspect of the present invention, the information display part: divides a total operation amount in a range in which the operation amount of the operator varies from an operation starting point to an operation end point, into small divisions in the number as many as that of a plurality of the segments; assigns display areas of a plurality of the segments to the respective small divisions; and sets the segment corresponding to the small division which is assigned on a side closest to the operation end point, from among one or more of the small divisions constituting the operation amount, as the peak segment. When the target value is changed, and also when the operation amount varies in the direction in which the ratio of the operation amount display position to the target display position becomes closer to the ratio of the operation amount to the target value, the information display part assigns the display area of the peak segment such that the operation amount is not included within the display area of the peak segment, with a variation in the operation amount smaller than that when the operation amount varies in the opposite direction.

According to the sixth aspect of the present invention, when the target value is changed, and also when the operation amount varies in the direction in which the ratio of the operation amount display position to the target display position becomes closer to the actual ratio, the peak segment shifts quickly. In contrast, when the operation amount varies in the direction in which the ratio of the operation amount display position to the target display position becomes farther away from the actual ratio, the peak segment shifts moderately.

According to a seventh aspect of the present invention, the operator is an accelerator pedal to which an applied reaction force generated by a reaction force applicator is applied, to thereby increase a pedal reaction force. The setting part sets an operation amount when the pedal reaction force is increased by the applied reaction force generated by the reaction force applicator, as the target value. The information display part displays prescribed force application information, when the operation amount exceeds the target value.

According to the seventh aspect of the present invention, the information display part can: convert the operation amount of the accelerator pedal into the operation amount display position; set a threshold operation amount at which the applied reaction force is applied to the accelerator pedal, as the target value; display the force application information, when the operation amount of the accelerator pedal exceeds the target value, that is, when the applied reaction force is applied; and notify the driver that the applied reaction force has been applied, using visual information.

In the present invention, the operation amount display apparatus can be provided which can display an operation amount of an operator without giving a driver a sense of something odd.

BRIEF DESCRIPTION OF THE DRAWINGS

FIG. 3A is a diagram illustrating a state where the accelerator operation amount exceeds the threshold operation amount. FIG. 3B is a diagram illustrating a state where the threshold operation amount varies to eventually become smaller than the accelerator operation amount. FIG. 3C is a diagram illustrating a state where the threshold operation amount varies to eventually become larger than the accelerator operation amount.

FIG. 4 is a diagram illustrating changes in a display state of the operation amount display section, when the accelerator operation amount is larger than the threshold operation amount, and the threshold operation amount varies to eventually become larger than the accelerator operation amount, according to the embodiment.

FIG. 5A is a diagram illustrating the display state of the operation amount display section in the states 1 to 3. FIG. 5B is a diagram illustrating the display state of the operation amount display section in the states 4 and 5. FIG. 5C is a diagram illustrating the display state of the operation amount display section in the state 6. FIG. 5D is a diagram illustrating the display state of the operation amount display section in the states 7 and 8.

FIG. 8A is a diagram illustrating the display state of the operation amount display section in the states 10 to 12. FIG. 8B is a diagram illustrating the display state of the operation amount display section in the states 13 and 14. FIG. 8C is a diagram illustrating the display state of the operation amount display section in the state 15. FIG. 8D is a diagram illustrating the display state of the operation amount display section in the states 16 and 17.

DESCRIPTION OF EMBODIMENT

Figure 1:
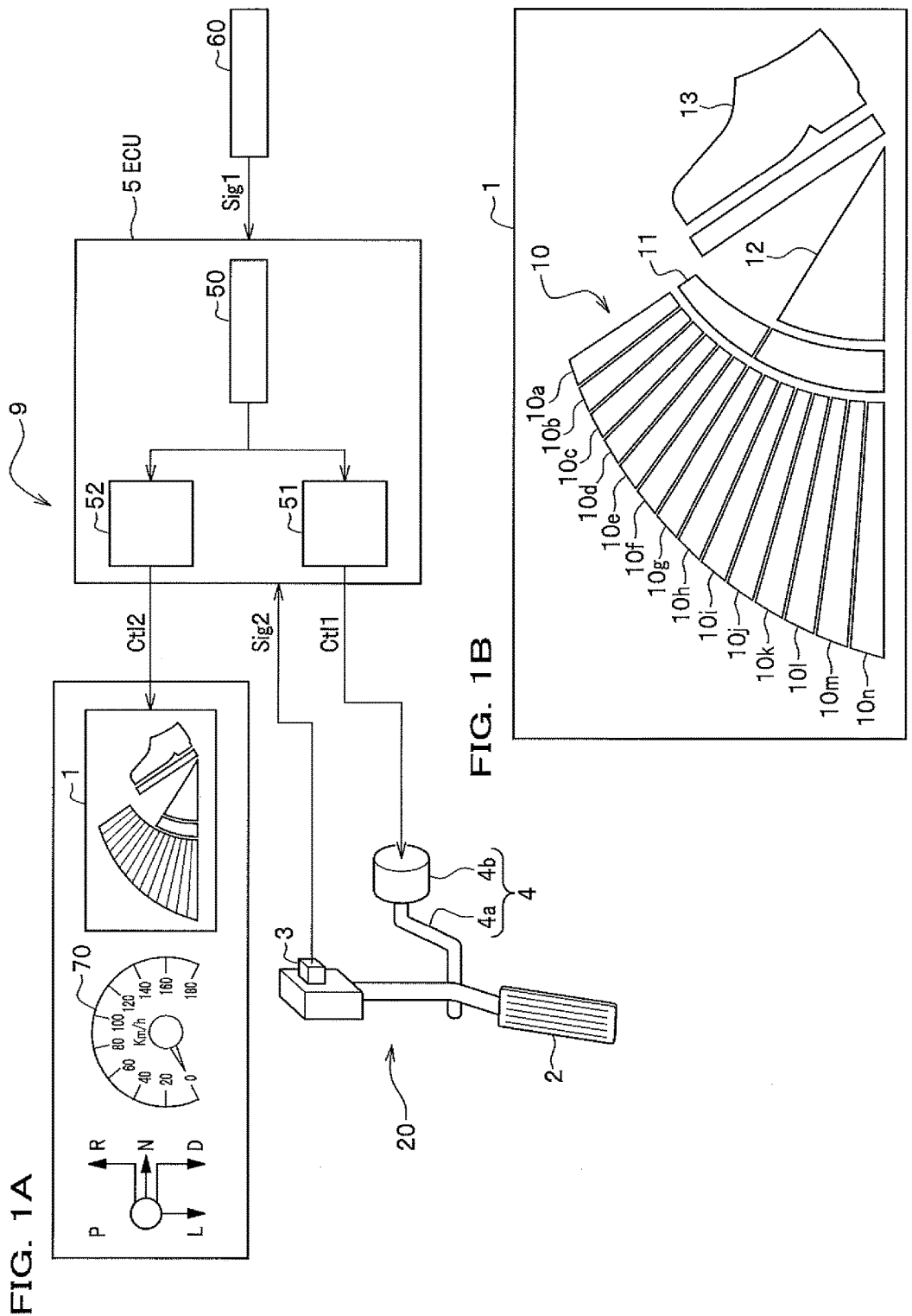
FIG. 1A is a schematic diagram illustrating an accelerator pedal operation amount display apparatus according to an embodiment of the present invention.
FIG. 1B is an enlarged diagram illustrating a display device thereof according to the embodiment.

An embodiment of the present invention is described in detail below with reference to the related drawings where appropriate.

FIG. 1A is a schematic diagram illustrating an accelerator pedal operation amount display apparatus according to this embodiment of the present invention. FIG. 1B is an enlarged diagram illustrating a display device thereof.

A pedal operation amount display apparatus 9 according to this embodiment is an operation amount display apparatus which displays an operation amount (which may also be referred to as an accelerator operation amount SL) of an operator (an accelerator pedal 2) included in a pedal operation device 20.

The pedal operation device 20 includes the accelerator pedal 2, a stroke sensor 3, and a reaction force generator 4. The accelerator pedal 2 automatically returns to a prescribed starting point position (an operation starting point) by an energizing means (a return spring or the like) not shown. The accelerator pedal 2 is constantly given a prescribed reaction force (a pedal reaction force Pp) by the energizing means.

The stroke sensor 3: detects an operation amount of depressing the accelerator pedal 2; converts the amount into a detection signal (an operation amount signal Sig2); and outputs the signal.

The reaction force generator 4 increases the pedal reaction force Pp of the accelerator pedal 2. The reaction force generator 4 includes: an electric motor (a reaction force motor 4b); and a reaction force arm 4a which transmits torque generated by the reaction force motor 4b to the accelerator pedal 2. The reaction force motor 4b is under control of an ECU (Electronic Control Unit) 5.

The reaction force generator 4 generates a reaction force applied to the accelerator pedal 2 (which is hereinafter referred to as an applied reaction force Pa). The applied reaction force Pa generated by the reaction force generator 4 is applied to the pedal reaction force Pp which is given to the accelerator pedal 2 by the energizing means. The reaction force generator 4 is a reaction force applicator which increases the pedal reaction force Pp by applying the generated applied reaction force Pa.

A structure of the reaction force generator 4 is not limited to any specific one. The reaction force generator 4 according to this embodiment is constituted to apply torque of the reaction force arm 4a rotated by the reaction force motor 4b to the accelerator pedal 2 such that a depressing operation thereof by a driver is blocked; and the applied reaction force Pa is added to the pedal reaction force Pp. That is, the larger the torque generated in the reaction force motor 4b, the larger the applied reaction force Pa to be applied. This results in a large increase in the pedal reaction force Pp.

The ECU 5 includes an assist reaction force calculation part 50, a target reaction force output part 51, and a display control part 52. The assist reaction force calculation part 50 calculates the applied reaction force Pa. The target reaction force output part 51 outputs a control signal (a motor driving signal Ctl1) for controlling the reaction force motor 4b such that torque for applying the applied reaction force Pa calculated by the assist reaction force calculation part 50 to the pedal reaction force Pp is generated.

Note that a function of the assist reaction force calculation part 50 is realized by, for example, executing a prescribed program by means of a CPU (Central Processing Unit) not shown of the ECU 5.

The ECU 5 receives an input of the operation amount signal Sig2 from the stroke sensor 3 and also receives a wheel speed signal Sig1 from a wheel speed sensor 60.

The ECU 5 according to this embodiment controls the reaction force generator 4 (the reaction force motor 4b) and thereby applies the prescribed applied reaction force Pa to the pedal reaction force Pp, when the accelerator operation amount SL exceeds a prescribed target value (which may also be referred to as a "threshold operation amount Th1" to be described later in this embodiment).

The pedal operation amount display apparatus 9 includes the display device 1 and the ECU 5. The display device 1 displays the applied reaction force Pa or the accelerator operation amount SL applied to the pedal reaction force Pp by means of light emission. The display device 1 is under control of a control part (which may be specifically referred to as the display control part 52) included in the ECU 5. The display device 1 and the display control part 52 constitute an information display part according to this embodiment.

The display control part 52 outputs a control signal (a display signal Ctl2) for controlling the display device 1, based on the applied reaction force Pa calculated by the assist reaction force calculation part 50 or the accelerator operation amount SL.

As illustrated in FIG. 1A, the display device 1 is preferably but not necessarily disposed in an easy to see position for a driver, for example, near a speedometer 70. The display device 1 is constituted to allow visual representation of the accelerator operation amount SL or the like, using a combination of segments composed of light emitting substance such as an organic EL (Electro-Luminescence) and a light emitting diode.

As illustrated in FIG. 1B, for example, the display device 1 includes an operation amount display section 10, an efficiency display section 11, a range display section 12, and a pedal icon 13.

The operation amount display section 10: is arranged in an arc shape in which a plurality of segments are suggestive of rotation of a pedal; and represents a variation in the accelerator operation amount SL by means of light emission of a plurality of the segments. The operation amount display section 10 is preferably but not necessarily constituted by eight or more segments. The operation amount display section 10 according to this embodiment includes fourteen segments (a first segment 10a, a second segment 10b, a third segment 10c, a fourth segment 10d, a fifth segment 10e, a six segment 10f, a seventh segment 10g, an eighth segment 10h, a ninth segment 10i, a tenth segment 10j, an eleventh segment 10k, a twelfth segment 10l, a thirteenth segment 10m, and a fourteenth segment 10n).

The operation amount display section 10 displays the accelerator operation amount SL in a form of fourteen segments which is obtained by dividing the accelerator operation amount SL of interest.

The first segment 10a to the sixth segment 10f are each set as a normal reaction force display segment. The normal reaction force display segment emits light in a first color (for example, white). The other segments (the seventh segment 10g to the fourteenth segment 10n) are each set as an increasing reaction force display segment. The increasing reaction force display segment emits light in a second color (for example, blue). The first color and the second color are different from each other. A combination of the first color and the second color is not limited to white and blue.

The operation amount display section 10 emits light sequentially starting from the first segment 10a toward the fourteenth segment 10n in accordance with increase in the accelerator operation amount SL. In an opposite manner, the operation amount display section 10 sequentially stops the light emission from the fourteenth segment 10n toward the first segment 10a in accordance with decrease in the accelerator operation amount SL.

The efficiency display section 11 is composed of an arc-shaped segment (an organic EL or the like) which is suggestive of rotation of a pedal. The efficiency display section 11 is disposed on an arch-shaped inner circumference side of the operation amount display section 10 in which the normal reaction force display segments are arranged.

The range display section 12 is a display composed of a fan-shaped segment (an organic EL or the like). The range display section 12 displays, in a fan-like form, the accelerator operation amount SL from which the applied reaction force Pa is generated. The range display section 12 is disposed on an inner circumference side of the increasing reaction force display segments which are arranged in the arc shape.

The pedal icon 13 is an icon with which a driver can easily associate rotation of the pedal (the rotation of the accelerator pedal 2 by a depressing operation) with the arc shapes of the operation amount display section 10, the efficiency display section 11, and the range display section 12. The pedal icon 13 may be composed of light emitting substance such as an organic EL or a light emitting diode, or may be a drawing in ink or the like.

Figure 2:
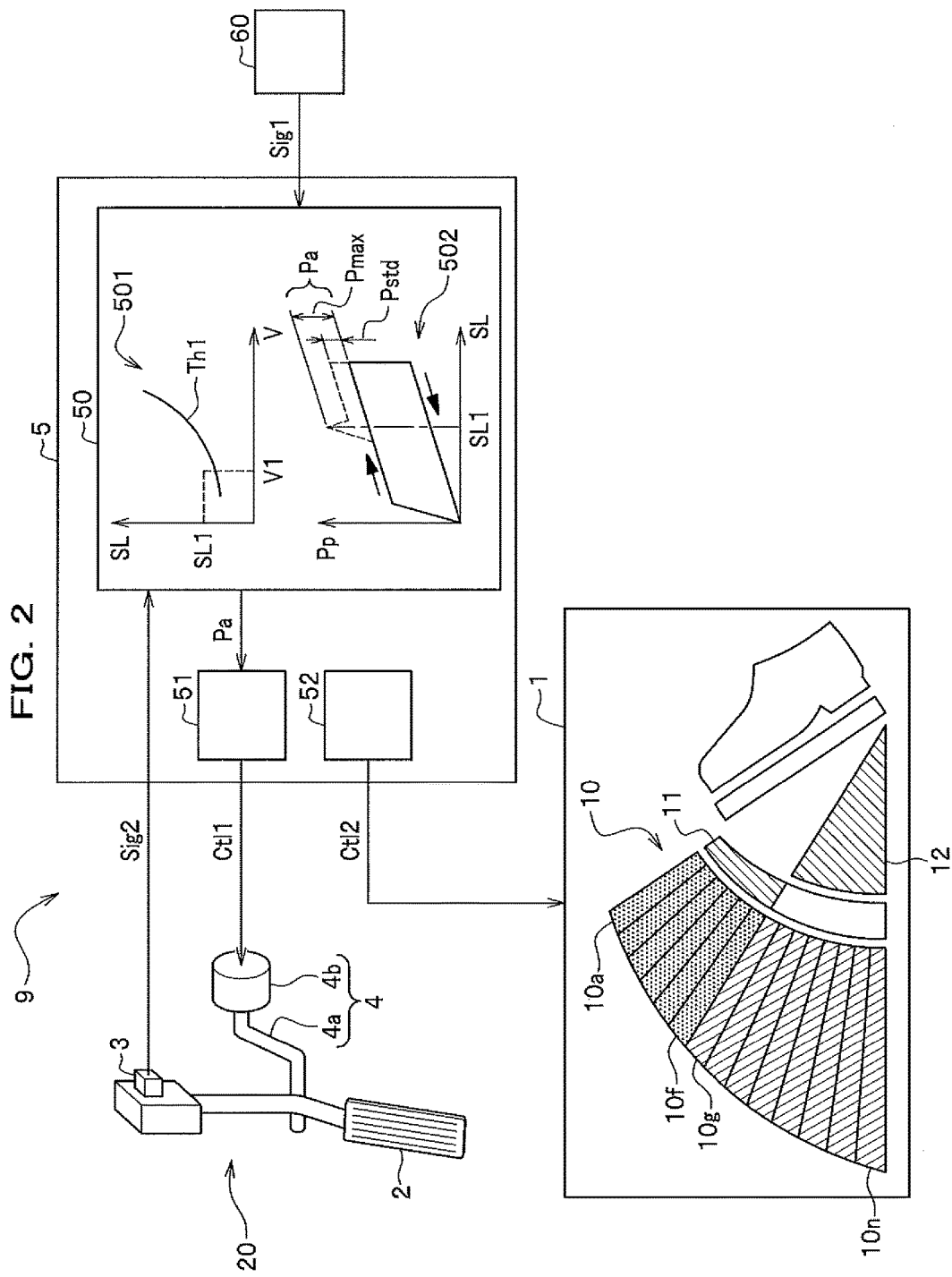
FIG. 2 is a diagram illustrating a display state of the display device when an applied reaction force is generated according to the embodiment.

FIG. 2 is a diagram illustrating a display state of the display device 1 when an applied reaction force is generated.

The assist reaction force calculation part 50 of the ECU 5 calculates the applied reaction force Pa. The target reaction force output part 51 thereof controls the reaction force motor 4b such that the calculated applied reaction force Pa is generated. The display control part 52 thereof controls the display device 1 in accordance with the accelerator operation amount SL of the accelerator pedal 2.

The assist reaction force calculation part 50: computes a vehicle speed V based on the wheel speed signal Sig1 inputted from the wheel speed sensor 60; and also computes the accelerator operation amount SL based on an operation amount signal Sig2 inputted from the stroke sensor 3. The assist reaction force calculation part 50 then: references a preset assist map 501; and determines whether or not the applied reaction force Pa is generated, based on the computed vehicle speed V and the accelerator operation amount SL.

If the assist reaction force calculation part 50 determines that the applied reaction force Pa is generated, the assist reaction force calculation part 50 calculates and inputs the applied reaction force Pa into the target reaction force output part 51. The target reaction force output part 51 outputs the motor driving signal Ctl1 such that torque for applying the applied reaction force Pa calculated by the assist reaction force calculation part 50 to the pedal reaction force Pp is generated in the reaction force motor 4b.

The assist map 501 is a map which is preset based on performance or the like of a vehicle (not shown) and in which a threshold operation amount Th1 in which the applied reaction force Pa is generated is set for each vehicle speed V. The threshold operation amount Th1 as described above is set where appropriate based on driving performance or the like required for the vehicle not shown.

The assist reaction force calculation part 50: references the assist map 501; and thereby sets the threshold operation amount Th1 in accordance with the computed vehicle speed V. In this embodiment, the threshold operation amount Th1 is taken as a target value of the accelerator operation amount SL. The assist reaction force calculation part 50 serves as a setting part which sets the threshold operation amount Th1 (the target value). The assist reaction force calculation part 50 determines that the applied reaction force Pa is generated, if the accelerator operation amount SL is larger than the set threshold operation amount Th1. The assist reaction force calculation part 50 calculates the applied reaction force Pa based on an applied reaction force map 502 illustrated in FIG. 2. Note that a solid line of the applied reaction force map 502 illustrated in FIG. 2 indicates the pedal reaction force Pp applied to the accelerator pedal 2 by the energizing means. A dashed line thereof indicates the applied reaction force Pa applied to the pedal reaction force Pp by the reaction force generator 4.

The assist reaction force calculation part 50 monitors the accelerator operation amount SL by monitoring the operation amount signal Sig2. The assist reaction force calculation part 50 calculates, on the assist map 501, the applied reaction force Pa which takes an instantaneously large value (whose magnitude is hereinafter referred to as a "Pmax"), when the accelerator operation amount SL which has been on an increase eventually exceeds the threshold operation amount Th1. For example, if the threshold operation amount Th1 takes a value "SL1" when the vehicle speed V takes a value "V1", the assist reaction force calculation part 50 calculates the largest applied reaction force Pa (whose magnitude is the "Pmax"), when the accelerator operation amount SL reaches the "SL1".

As described above, when the accelerator operation amount SL which has been on an increase eventually exceeds the threshold operation amount Th1, the applied reaction force Pa is generated which takes an instantaneously large value and is applied to the pedal reaction force Pp. This causes a step-like sharp rise in the pedal reaction force Pp of the accelerator pedal 2, which can give a driver a large tactile pressure sensitivity.

Then, when the accelerator pedal 2 is further depressed and the accelerator operation amount SL is increased, the assist reaction force calculation part 50 calculates a constant applied reaction force Pa (whose magnitude is referred to as a "Pstd"). Note that the magnitude (Pstd) of the constant applied reaction force Pa calculated by the assist reaction force calculation part 50 may be set where appropriate based on driving performance or the like required for the vehicle not shown.

The target reaction force output part 51 of the ECU 5 outputs the motor driving signal CM for generating torque in the reaction force motor 4b for applying the applied reaction force Pa calculated by the assist reaction force calculation part 50 to the pedal reaction force Pp.

In the operation amount display section 10, the first segment 10a to the sixth segment 10f set as the normal reaction force display segments are each a segment whose light emitting state (emitting or stopping light) changes in accordance with a variation in the accelerator operation amount SL within a range within which the accelerator operation amount SL is smaller than the threshold operation amount Th1. The normal reaction force display segment changes the light emitting state thereof in accordance with a variation in the accelerator operation amount SL in an amount corresponding to one sixth of the range smaller than the threshold operation amount Th1.

The seventh segment 10g to the fourteenth segment 10n set as the increasing reaction force display segments are each a segment whose light emitting state changes in accordance with a variation in the accelerator operation amount SL within a range within which the accelerator operation amount SL is larger than the threshold operation amount Th1. The increasing reaction force display segment changes the light emitting state thereof in accordance with a variation in the accelerator operation amount SL in an amount corresponding to one eighth of the range larger than the threshold operation amount Th1.

The display control part 52 makes the segments of the operation amount display section 10 (the first segment 10a to the fourteenth segment 10n) emit light in accordance with the accelerator operation amount SL. At this time, the display control part 52 makes the normal reaction force display segments (the first segment 10a to the sixth segment 10f) emit light in the prescribed first color (white or the like). The display control part 52 also makes the increasing reaction force display segments (the seventh segment 10g to the fourteenth segment 10n) emit light in the second color (blue or the like) which is different from the first color (white). FIG. 2 illustrates the display state of the operation amount display section 10 when the accelerator pedal 2 is depressed up to an operation end point. Note that in FIG. 2, dots with which the segment is filled represent light emission in the first color (white), and diagonal lines with which the segment is filled represent light emission in the second color (blue) (hereinafter the same).

When the display control part 52 makes the seventh segment 10g emit light, the display control part 52 also makes the efficiency display section 11 and the range display section 12 emit light in the second color (blue) which is same as the color of the seventh segment 10g.

When the display control part 52 makes the seventh segment 10g stop light emission, the display control part 52 also makes the efficiency display section 11 and the range display section 12 stop light emission.

As described above, in the display device 1 of the pedal operation amount display apparatus 9, the operation amount display section 10 emits light in accordance with the accelerator operation amount SL. In the operation amount display section 10, the number of the segments which emit light is determined in accordance with the accelerator operation amount SL. That is, the display device 1: converts the accelerator operation amount SL into an operation amount display position which is a position at which the operation amount display section 10 emits light (a position of a segment emitting light); and displays the operation amount display position. The operation amount display position herein is a position of a segment which emits light when the operation amount display section 10 displays the accelerator operation amount SL.

When the accelerator operation amount SL is equal to the threshold operation amount Th1, a prescribed number (in this embodiment, six) of the normal reaction force display segments (the first segment 10a to the sixth segment 10f) emit light; and the eight increasing reaction force display segments (the seventh segment 10g to the fourteenth segment 10n) emit no light.

As described above, the display device 1 displays the accelerator operation amount SL as the threshold operation amount Th1 at a prescribed target display position (a position at which the six normal reaction force display segments emit light). The display device 1 has an operation amount display position when the accelerator operation amount SL (an operation amount) is equal to the threshold operation amount Th1 (a target value), as the target display position. In other words, the target display position indicates a position of a segment which emits light when the operation amount is equal to the target value. In this embodiment, the target display position is designed to be set at a fixed position at which the sixth segment 10f emits light (a prescribed position). The display device 1 sets the operation amount display position, taking the target display position as a reference position.

As described above, the normal reaction force display segments (the first segment 10a to the sixth segment 10f) of the operation amount display section 10 each change a light emitting state thereof in accordance with a variation in the accelerator operation amount SL within the range within which the accelerator operation amount SL is smaller than the threshold operation amount Th1. Similarly, the increasing reaction force display segments (the seventh segment 10g to the fourteenth segment 10n) each change a light emitting state thereof in accordance with a variation in the accelerator operation amount SL within the range within which the accelerator operation amount SL is larger than the threshold operation amount Th1.

The threshold operation amount Th1 varies in accordance with the vehicle speed V. That is, when the vehicle speed V varies, the threshold operation amount Th1 varies, and a display state of the operation amount display section 10 also changes. In other words, even when the accelerator operation amount SL remains unchanged, the threshold operation amount Th1 varies in accordance with a variation in the vehicle speed V, and the display state of the operation amount display section 10 also changes.

Figure 3A:
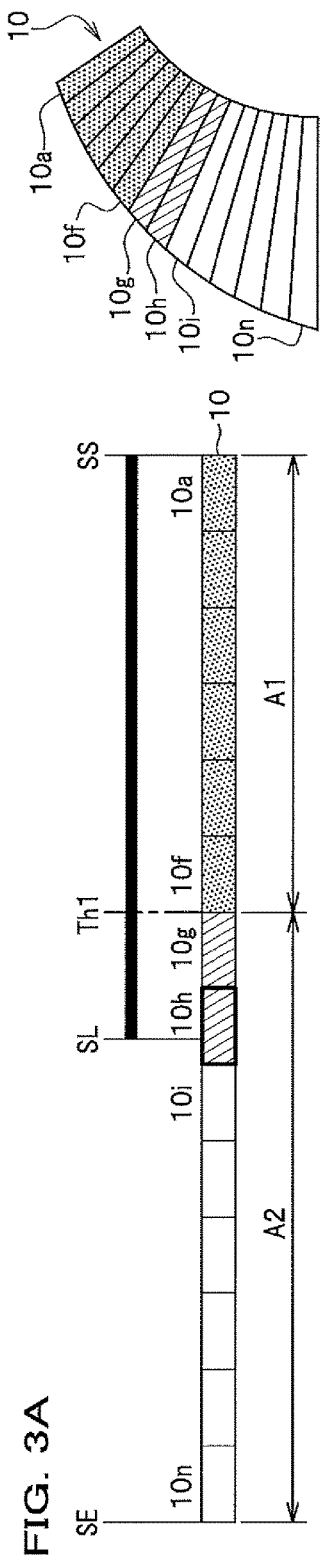
FIGS. 3A to 3C are each a diagram illustrating a relationship between an accelerator operation amount, a threshold operation amount, and a segment which emits light, according to the embodiment.
Figure 3B:
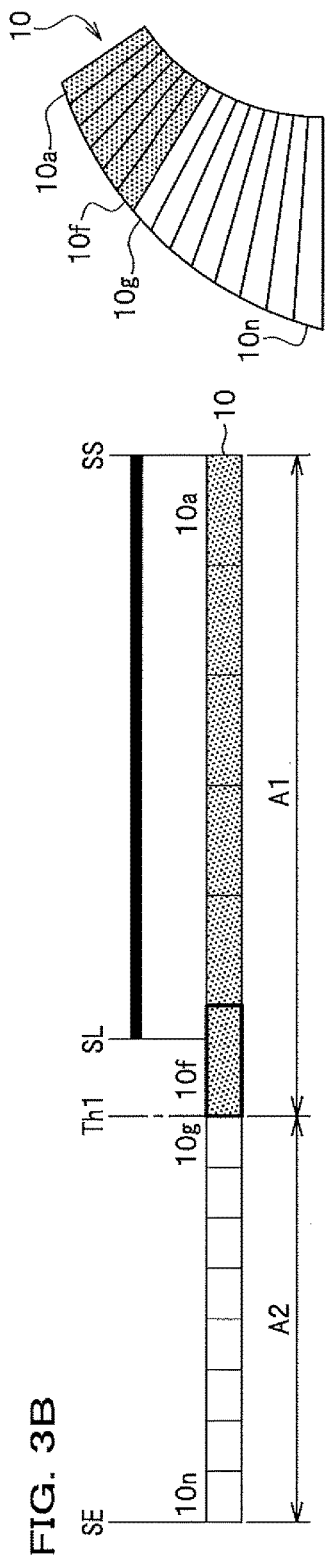
Figure 3C:
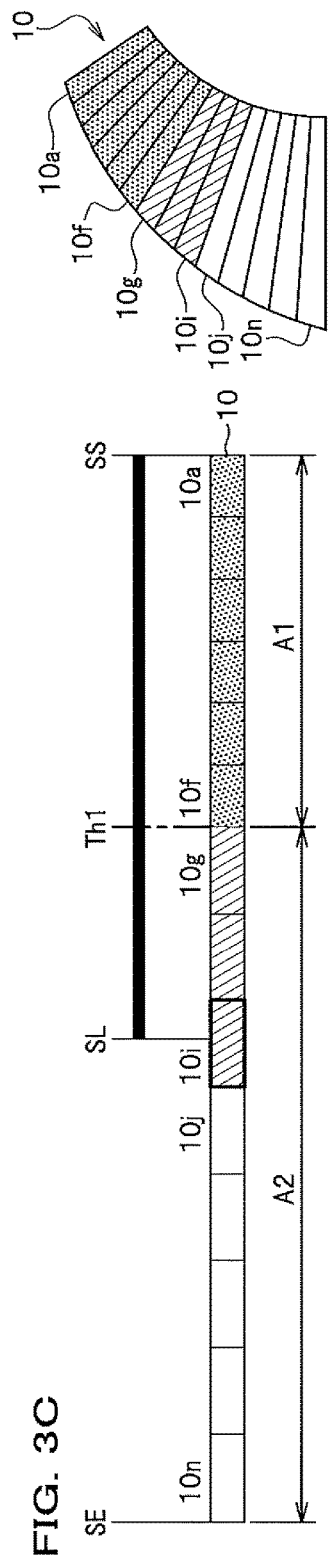

FIGS. 3A to 3C are each a diagram illustrating a relationship between an accelerator operation amount, a threshold operation amount, and a segment which emits light. FIG. 3A is a diagram illustrating a state where an accelerator operation amount exceeds a threshold operation amount. FIG. 3B is a diagram illustrating a state where the threshold operation amount varies to eventually become smaller than the accelerator operation amount. FIG. 3C is a diagram illustrating a state where the threshold operation amount varies to eventually become larger than the accelerator operation amount.

As illustrated on a left side in each of FIGS. 3A to 3C, a range within which the accelerator operation amount SL varies is designed to be from a zero stroke position (an operation starting point SS) to a full stroke position (an operation end point SE). An amount represented by a length from the operation starting point SS to the operation end point SE is therefore a total operation amount of the accelerator pedal 2 (see FIG. 1).

An area on a side nearer to the operation end point SE than the threshold operation amount Th1 is referred to as an area in which an increasing reaction force display segment emits light (a second light emitting area A2). An area on a side nearer to the operation starting point SS than the threshold operation amount Th1 is referred to as an area in which a normal reaction force display segment emits light (first light emitting area A1). The accelerator operation amount SL is represented by a black bar.

The operation amount display section 10 illustrated on a left side of each of FIGS. 3A to 3C illustrates a length corresponding to a light emitting area of each segment in accordance with the accelerator operation amount SL. A segment or segments corresponding to an extension of the bar indicating the accelerator operation amount SL emit light. A segment which emits light at a position nearest to the operation end point SE is referred to as a segment indicating an operation amount display position at that point in time (which may also be referred to as a peak segment). Note that in this embodiment, a segment which emits light is referred to as a displayed segment, and a light emitting area of the segment is referred to as a display area of the segment.

The peak segment shifts in accordance with a variation in the operation amount display position. In other words, the peak segment shifts in accordance with a variation in the accelerator operation amount SL.

As illustrated in FIGS. 3A to 3C, the display control part 52 (see FIG. 1) divides the range within which the accelerator operation amount SL of the accelerator pedal 2 (see FIG. 1) varies (which may also be referred to as the total operation amount), into small divisions in the number as many as that of the segments included in the operation amount display section 10 (in this embodiment, fourteen). The display control part 52 assigns fourteen light emitting areas (display areas) of the segments to the respective fourteen small divisions; and displays the accelerator operation amount SL using the fourteen segments.

The display control part 52 further controls the display device 1 such that a segment whose corresponding small division constituting the accelerator operation amount SL is assigned the light emitting area (in FIG. 3A illustrated as an example, the first segment 10a to the eighth segment 10h) emits light. Of one or more of the small divisions each constituting the accelerator operation amount SL, a segment assigned closest to the operation end point SE (in FIG. 3A illustrated as the example, the eighth segment 10h) is referred to as a peak segment.

The display control part 52 (see FIG. 1): divides the first light emitting area A1 (on a side nearer to the operation starting point SS than the threshold operation amount Th1) into six equal portions; and assigns the six divided portions to respective light emitting areas of the normal reaction force display segments. The display control part 52 also: divides the second light emitting area A2 (on a side nearer to the operation end point SE than the threshold operation amount Th1) into eight equal portions; and assigns the eight divided portions to respective light emitting areas of the increasing reaction force display segments.

Thus, as illustrated in FIG. 3A, when the accelerator operation amount SL exceeds the threshold operation amount Th1, all of the six normal reaction force display segments emit light in white.

Further, when the accelerator operation amount SL exceeds the threshold operation amount Th1, one or more of the increasing reaction force display segments emit light in accordance with an exceeding amount. As illustrated in FIG. 3A, when the accelerator operation amount SL exceeds the threshold operation amount Th1 by a range of one eighth to two eighths in the second light emitting area A2 across the threshold operation amount Th1, two increasing reaction force display segments (the seventh segment 10g and the eighth segment 10h) emit light in blue. The other increasing reaction force display segments (the ninth segment 10i to the fourteenth segment 10n) emit no light. A segment which emits no light (or whose light emission is stopped) is hereinafter illustrated as an outlined segment.

In FIG. 3A, the eighth segment 10h is a peak segment. The peak segment is hereinafter illustrated with a thick frame. Note that the display state of the operation amount display section 10 is illustrated on a right side of each of FIGS. 3A to 3C.

As described above, when the accelerator operation amount SL exceeds the threshold operation amount Th1, the display control part 52 makes one or more of the increasing reaction force display segments (the seventh segment 10g to the fourteenth segment 10n) emit blue light. In other words, the display device 1 displays force application information by means of blue light emission so as to show that the accelerator operation amount SL exceeds the threshold operation amount Th1.

As illustrated in FIG. 3B, when the threshold operation amount Th1 is increased in accordance with an increase in the vehicle speed V of a vehicle (not shown), all of the six normal reaction force display segments emit white light, and the eight increasing reaction force display segments stop light emission. The sixth segment 10f then becomes a peak segment.

As illustrated in FIG. 3C, when the threshold operation amount Th1 is decreased in response to a decrease in the vehicle speed V of the vehicle, all of the six normal reaction force display segments emit white light, and three of the eight increasing reaction force display segments (the seventh segment 10g to the ninth segment 10i) emit blue light. The other increasing reaction force display segments (the tenth segment 10j to the fourteenth segment 10n) emits no light. The ninth segment 10i becomes a peak segment.

As described above, the display control part 52 converts the accelerator operation amount SL into an operation amount display position, taking the target display position as the reference position; and sequentially displays variations of the target display position in the display device 1.

As illustrated in FIGS. 3A to 3C, in a conventional technique, even if the accelerator operation amount SL does not vary, when the threshold operation amount Th1 varies, a display state in the operation amount display section 10 is changed.

That is, even if a driver does not change an operation amount of depressing the accelerator pedal 2 (see FIG. 1), the display state in the operation amount display section 10 changes. This results in inconsistency between the change of the display state in the operation amount display section 10 and behavior of the accelerator pedal 2, which gives the driver a sense of something odd.

In light of the described above, the ECU 5 (see FIG. 1) according to this embodiment changes the display state of the operation amount display section 10 when the threshold operation amount Th1 varies, so as not to give the driver a sense of something odd.

FIG. 4 is a diagram illustrating changes in the display state of the operation amount display section 10, when the accelerator operation amount is larger than the threshold operation amount, and the threshold operation amount varies to eventually become larger than the accelerator operation amount.

As illustrated in FIG. 4, let a state 1 (ST1) be a state of the operation amount display section 10 in which: the accelerator operation amount SL is larger than the threshold operation amount Th1; all of the normal reaction force display segments emit white light; and three increasing reaction force display segments (the seventh segment 10g to the ninth segment 10i) emit blue light. In the state 1, the ninth segment 10i is a peak segment.

Let a state 2 (ST2) be a state of the operation amount display section 10 in which: the vehicle speed V is accelerated from the state 1; and the threshold operation amount Th1 eventually becomes larger than the accelerator operation amount SL. In the state 2, the display control part 52 (see FIG. 1) sets an area on an operation end point SE side of the threshold operation amount Th1, as a new second light emitting area A2. The display control part 52 divides the new second light emitting area A2 into eight equal portions; and assigns the eight divided portions to respective light emitting areas of the increasing reaction force display segments.

The display control part 52 assigns light emitting areas of the segments (the tenth segment 10j to the fourteenth segment 10n) on an operation end point SE side of the peak segment (the ninth segment 10i), to the respective areas from the operation end point SE.

Further, the display control part 52 (see FIG. 1) assigns an area on the operation starting point SS side of the area which has been assigned as the light emitting areas of the segments (the tenth segment 10j to the fourteenth segment 10n) on the operation end point SE side of the peak segment, to a light emitting area of the peak segment (the ninth segment 10i). The display control part 52 thus assigns even an area smaller than the accelerator operation amount SL, to the light emitting area of the peak segment.

Note that by how much the light emitting area of the peak segment (the ninth segment 10i) is made to be smaller than the accelerator operation amount SL, that is, how large the display control part 52 determines the "Δa" illustrated in FIG. 4 is preferably but not necessarily preset by simulation or the like in advance.

The "Δa" illustrated in FIG. 4 is preferably sufficiently shorter than a length from the accelerator operation amount SL to the tenth segment 10j. This allows that the light emitting area of the peak segment on a side on which the accelerator operation amount SL varies (on an eighth segment 10h side) in a direction in which a ratio of an operation amount display position to a target display position corresponding to threshold operation amount Th1 after the variation becomes closer to a ratio of the accelerator operation amount SL to the threshold operation amount Th1, is set smaller than the light emitting area of the peak segment on a side on which the accelerator operation amount SL varies (on a tenth segment 10j side) in the opposite direction.

Then, a variation of the accelerator operation amount SL based on which the peak segment is shifted varies in accordance with a variation in the threshold operation amount Th1.

If there is an increasing reaction force display segment which emits light, other than the peak segment of the operation amount display section 10 in the state 1, the display control part 52 (see FIG. 1) assigns an area on the operation starting point SS side of the light emitting area of the peak segment, to a light emitting area of the increasing reaction force display segment of interest. In FIG. 4, the eighth segment 10h and the seventh segment 10g are the segments of interest. The display control part 52 sets respective light emitting areas of the segments of interest (the eighth segment 10h and the seventh segment 10g) as small areas. By how much the light emitting area of the segment of interest, that is, how large the display control part 52 determines a "Δb" illustrated in FIG. 4 is preferably preset by simulation or the like in advance.

The display control part 52 also sets an area on the operation starting point SS side of the threshold operation amount Th1 after the variation, as a new first light emitting area A1. The display control part 52: divides the new first light emitting area A1 into six equal portions; and assigns the six equal portions as respective light emitting areas of the normal reaction force display segments.

The display control part 52 sequentially assigns the light emitting areas of the first segment 10a to the sixth segment 10f, starting from the operation starting point SS side. At this time, if there is an area in which the currently assigned light emitting area is overlapped with the previously assigned light emitting area of the increasing reaction force display segment, the display control part 52 reduces a size of the light emitting area of the normal reaction force display segment of interest. This can prevent duplication between the light emitting areas of the increasing reaction force display segment and the normal reaction force display segment.

In FIG. 4 illustrated as an example, the light emitting area of the sixth segment 10f is set smaller in size.

When the threshold operation amount Th1 varies and thus brings the operation amount display section 10 into the state 2, the light emitting areas of the increasing reaction force display segments and the normal reaction force display segments are assigned as illustrated in FIG. 4. This allows the first segment 10a to the peak segment (the ninth segment 10i) to emit light even when the threshold operation amount Th1 varies, unless the accelerator operation amount SL does not vary. In other words, as long as the accelerator operation amount SL remains unchanged, the peak segment does not shift, and the display state of the operation amount display section 10 does not change, either.

Let a state 3 (ST3) be a state of the operation amount display section 10 in which the accelerator operation amount SL is reduced to a light emitting area of the segment (the eighth segment 10h) disposed on the operation starting point SS side of the peak segment (the ninth segment 10i).

When the operation amount display section 10 enters the state 3, the display control part 52 (see FIG. 1) changes a size of the light emitting area of the peak segment (the ninth segment 10i) to one eighth of the second light emitting area A2. The display control part 52 extends the light emitting area of the eighth segment 10h toward the operation end point SE side. The display control part 52 stops light emission of the peak segment (the ninth segment 10i). Let a state 4 (ST4) be a state of the operation amount display section 10 as described above. In the state 4, the eighth segment 10h becomes a new peak segment.

Let a state 5 (ST5) be a state of the operation amount display section 10 in which the accelerator operation amount SL is reduced to a light emitting area of a segment (the seventh segment 10g) disposed on the operation starting point SS side of the peak segment (the eighth segment 10h).

When the operation amount display section 10 enters the state 5, the display control part 52 (see FIG. 1) changes a size of the light emitting area of the peak segment (the eighth segment 10h) to one eighth of the second light emitting area A2. The display control part 52 extends the light emitting area of the seventh segment 10g toward the operation end point SE side. The display control part 52 stops light emission of the peak segment (the eighth segment 10h). Let a state 6 (ST6) be a state of the operation amount display section 10 as described above. In the state 6, the seventh segment 10g becomes a new peak segment.

When the accelerator operation amount SL is reduced to a light emitting area of a segment (the sixth segment 10f)

disposed on the operation starting point SS of the peak segment (the seventh segment 10g), the display control part 52 (see FIG. 1) stops light emission of the peak segment (the seventh segment 10g). Let a state 7 (ST7) be a state of the operation amount display section 10 as described above. In the state 7, the sixth segment 10f becomes a new peak segment.

When the operation amount display section 10 is in the state 7, the accelerator operation amount SL is smaller than the threshold operation amount Th1, and light emission of all of the increasing reaction force display segments are stopped. This means that when the operation amount display section 10 is in the state 7, the accelerator operation amount SL and the operation amount display section 10 have the same display states.

When the operation amount display section 10 enters the state 7, the display control part 52 (see FIG. 1): divides the new first light emitting area A1 into six equal portions; and sets the having-been-reduced light emitting area of the sixth segment 10f in an appropriate one of the six equal portions.

When the operation amount display section 10 enters the state 7, the display control part 52 also assigns the eight equally divided portions of the second light emitting area A2, to respective light emitting areas of the increasing reaction force display segments. That is, the display control part 52 changes a size of the light emitting area of the peak segment (the seventh segment 10g) in the state 6, to one eighth of the second light emitting area A2.

Let a state 8 (ST8) be a state of the operation amount display section 10 as described above.

In the state 8 in this embodiment, as illustrated at the ST8 in FIG. 4, the first segment 10a to the sixth segment 10f emit light, and light emission of the seventh segment 10g to the fourteenth segment 10n is stopped.

Figure 5A:
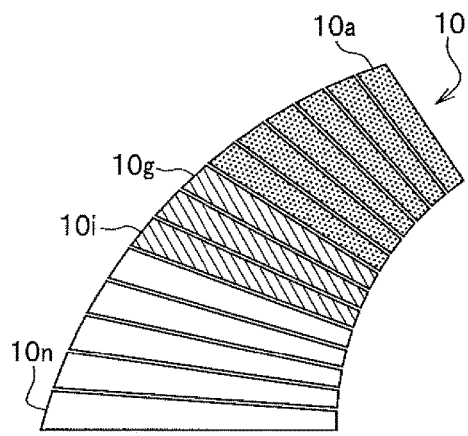
FIGS. 5A to 5D are diagrams illustrating the display states of the operation amount display section in states 1 to 8, according to the embodiment.
Figure 5B:
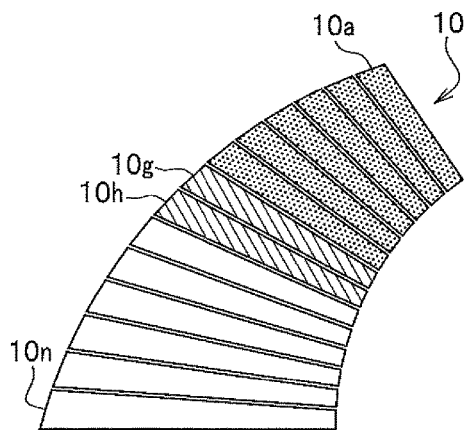
Figure 5C:
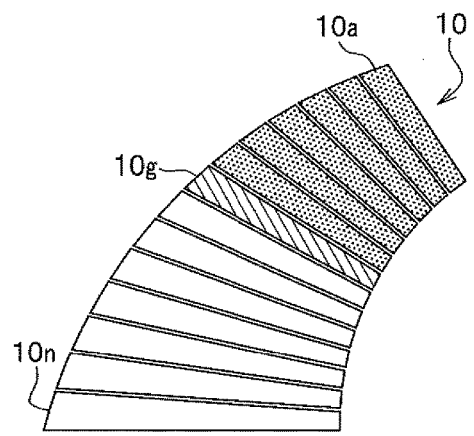
Figure 5D:
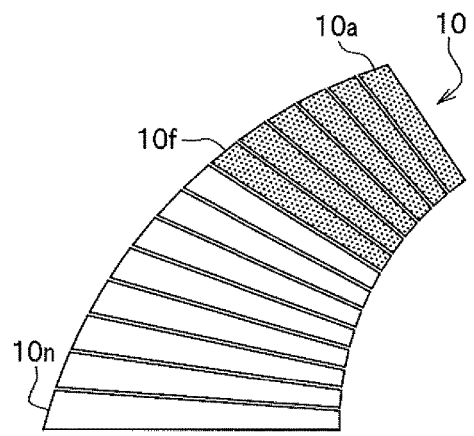

FIGS. 5A to 5D are each a diagram illustrating display states of the operation amount display section in the states 1 to 8. FIG. 5A is a diagram illustrating the display state of the operation amount display section in the states 1 to 3. FIG. 5B is a diagram illustrating the display state of the operation amount display section in the states 4 and 5. FIG. 5C is a diagram illustrating the display state of the operation amount display section in the state 6. FIG. 5D is a diagram illustrating the display state of the operation amount display section in the states 7 and 8. The state 1 (ST1) to the state 8 (ST8) illustrated in FIGS. 5A to 5D correspond to the state 1 to the state 8 illustrated in FIG. 4, respectively.

When the operation amount display section 10 is in the state 1 (ST1), as illustrated in FIG. 5A, all of the normal reaction force display segments emit white light, and three of the increasing reaction force display segments (from the seventh segment 10g to the ninth segment 10i) emit blue light.

When the threshold operation amount Th1 is increased to eventually become larger than the accelerator operation amount SL, the operation amount display section 10 enters the state 2 (ST2). In the state 2, even when the accelerator operation amount SL becomes smaller than the threshold operation amount Th1, the display state of the operation amount display section 10 remains unchanged.

Further, even when the accelerator operation amount SL is reduced and the operation amount display section 10 enters the state 3 (ST3), the display state of the operation amount display section 10 also remains unchanged.

When the operation amount display section 10 is in the state 3 (ST3), the display control part 52 (see FIG. 1) stops light emission of the ninth segment 10i and makes the operation amount display section 10 enter the state 4 (ST4).

Therefore, when the operation amount display section 10 enters the state 4, as illustrated in FIG. 5B, all of the normal reaction force display segments emit white light, and two of the increasing reaction force display segments (the seventh segment 10g and the eighth segment 10h) emit blue light.

If the accelerator operation amount SL is reduced when the operation amount display section 10 is in the state 4, the operation amount display section 10 shifts to the state 5 (ST5). In the state 5, even when the accelerator operation amount SL is reduced, the display state of the operation amount display section 10 remains unchanged.

When the operation amount display section 10 is in the state 5 (ST5), the display control part 52 (see FIG. 1) stops light emission of the eighth segment 10h and shifts the operation amount display section 10 to the state 6 (ST6). Therefore, when the operation amount display section 10 is in the state 6, as illustrated in FIG. 5C, all of the normal reaction force display segments emit white light, and one of the increasing reaction force display segments (the seventh segment 10g) emits blue light.

When the operation amount display section 10 is in the state 6 and the accelerator operation amount SL is reduced, the operation amount display section 10 shifts to the state 7 (ST7). When the operation amount display section 10 enters the state 7, the display control part 52 (see FIG. 1) stops light emission of the seventh segment 10g. Therefore, as illustrated in FIG. 5D, all of the normal reaction force display segments emit white light, and all of the increasing reaction force display segments stop light emission.

When the operation amount display section 10 enters the state 7, the display control part 52 (see FIG. 1): sets an area from the operation starting point SS to the threshold operation amount Th1 as a first light emitting area A1; and also sets an area from the threshold operation amount Th1 to the operation end point SE as a second light emitting area A2. This makes the operation amount display section 10 enter the state 8 (ST8). The display control part 52 makes the normal reaction force display segments emit light in accordance with the accelerator operation amount SL. In FIG. 4 illustrated as the example, even when the operation amount display section 10 is in the state 8, as illustrated in FIG. 5D, six normal reaction force display segments (the first segment 10a to the sixth segment 10f) emit white light.

When the operation amount display section 10 shifts from the state 2 through the state 8, the driver recognizes the change in the display state as if an operation of the accelerator pedal 2 reduces the number of the segments which emit light. Nevertheless, the driver feels that the display state of the operation amount display section 10 is consistent with the behavior of the accelerator pedal 2, which can reduce a sense of something odd felt by the driver.

When the threshold operation amount Th1 varies as illustrated in FIG. 4, the threshold operation amount Th1 after the variation is larger than the accelerator operation amount SL, and the threshold operation amount Th1 before the variation is smaller than the accelerator operation amount SL. Therefore, a ratio of an operation amount display position to a target display position corresponding to the threshold operation amount Th1 after the variation becomes smaller than a ratio of the accelerator operation amount SL to the threshold operation amount Th1.

In this case, as illustrated in FIG. 4, in which the accelerator operation amount SL is reduced, and thus, the ratio of the operation amount display position to the target display position corresponding to the threshold operation amount Th1 after the variation varies in a direction in which the ratio becomes closer to the ratio of the accelerator operation amount SL to the threshold operation amount Th1, the display control part 52 shifts the peak segment from the ninth segment 10*i* to the eighth segment 10*h* (from the state 2 to the state 4), with a variation smaller than that when the accelerator operation amount SL is increased (a variation in the accelerator operation amount SL). That is, when the accelerator operation amount SL varies in the direction closer to the ratio of the accelerator operation amount SL to the threshold operation amount Th1, the display control part 52 sets a light emission area of a segment to become the peak segment (in FIG. 4 illustrated as the example, the ninth segment 10*i*) such that the accelerator operation amount SL is not included within the light emitting area of the peak segment, with a variation smaller than that when the accelerator operation amount SL varies in the opposite direction.

When the accelerator operation amount SL is equal to the threshold operation amount Th1, the display control part 52 makes all of the normal reaction force display segments emit light and also makes all of the increasing reaction force display segments stop light emission thereof. That is, the display control part 52 makes the ratio of the operation amount display position to the target display position corresponding to the threshold operation amount Th1 after the variation, closer to the ratio of the accelerator operation amount SL to the threshold operation amount Th1.

Figure 6:
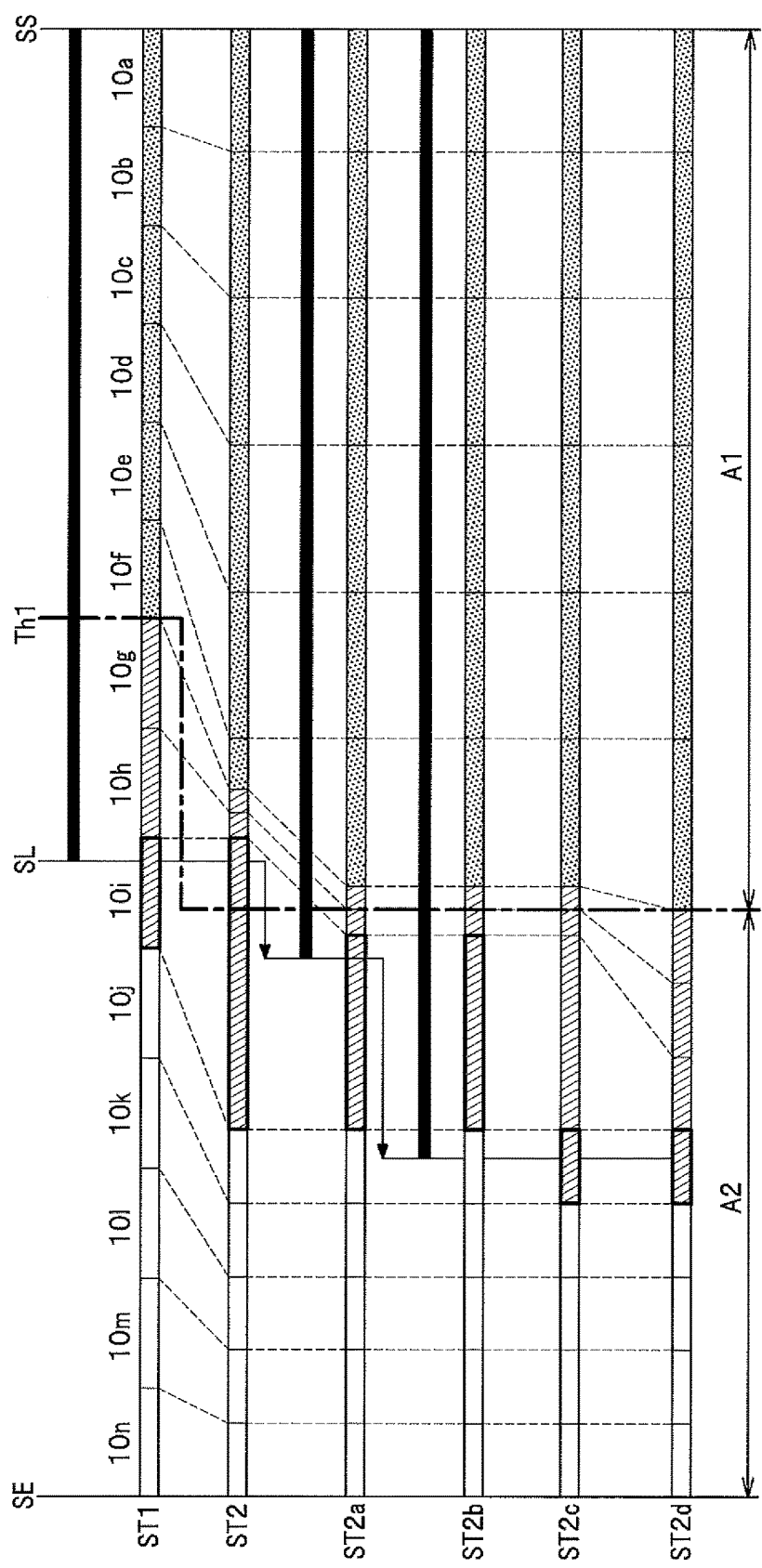
FIG. 6 is a diagram illustrating a change in the display state of the operation amount display section when the accelerator operation amount is increased from the state 2, according to the embodiment.

FIG. 6 is a diagram illustrating a change in the display state of the operation amount display section when the accelerator operation amount is increased from the state 2.

As illustrated in FIG. 6, Let a state 2*a* (ST2*a*) be a state of the operation amount display section 10, in which the accelerator operation amount SL is increased within a range of the light emitting area of the peak segment (the ninth segment 10*i*) in the state 2. In this case, the display control part 52 shifts the operation starting point SS side of the light emitting area of the peak segment (the ninth segment 10*i*) to the operation end point SE side in accordance with a variation in the accelerator operation amount SL. The light emitting area of the peak segment (the ninth segment 10*i*) is thus kept smaller than the accelerator operation amount SL by the "Δa". This allows the accelerator operation amount SL based on which the peak segment is shifted to vary in accordance with the accelerator operation amount SL.

The display control part 52 shifts the light emitting area having been assigned in a size of the "Δb" on the operation starting point SS side of the light emitting area of the peak segment (the light emitting areas of the eighth segment 10*h* and the seventh segment 10*g*), to the operation end point SE side in accordance with the light emitting area of the peak segment. The display control part 52 also extends the having-been-reduced light emitting area of the normal reaction force display segment (in FIG. 6 illustrated as the example, the light emitting area of the sixth segment 10*f*) to the operation end point SE side within a range within which the light emitting area of the normal reaction force display segment is not overlapped with that of the increasing reaction force display segment.

Let a state 2*b* (ST2*b*) be a state of the operation amount display section 10, in which the accelerator operation amount SL is further increased up to a light emitting area of a segment (the tenth segment 10*j*) disposed on the operation end point SE side of the peak segment (the ninth segment 10*i*) in the state 2*a*. When the operation amount display section 10 is in the state 2*b*, the display control part 52 (see FIG. 1): makes a segment (the tenth segment 10*j*) disposed on the operation end point SE side of the peak segment emit light; and determines the light emitting segment as a new peak segment. Let a state 2*c* (ST2*c*) be a state of the operation amount display section 10 as described above.

When the operation amount display section 10 enters the state 2*c*, the display control part 52 (see FIG. 1): assigns the normal reaction force display segments (the first segment 10*a* to the sixth segment 10*f*) as a first light emitting area A1; and also assigns the increasing reaction force display segments (the seventh segment 10*g* to the fourteenth segment 10*n*) as a second light emitting area A2. Let a state 2*d* (ST2*d*) be a state of the operation amount display section 10 as described above. The state 2*d* is a state same as the state 8 illustrated in FIG. 4. In the state 2*d*, the six normal reaction force display segments (the first segment 10*a* to the sixth segment 10*f*) emit light in accordance with the accelerator operation amount SL from the operation starting point SS to the threshold operation amount Th1. In the state 2*d*, the eight increasing reaction force display segments (the seventh segment 10*g* to the fourteenth segment 10*n*) emit light in accordance with the accelerator operation amount SL from the threshold operation amount Th1 to the operation end point SE. Thus, when the accelerator operation amount SL is larger than the threshold operation amount Th1, the increasing reaction force display segments emit light. When the accelerator operation amount SL is smaller than the threshold operation amount Th1, the increasing reaction force display segments emit no light.

As described above, even when the accelerator operation amount SL is increased, the display state of the operation amount display section 10 is changed along with an increase in the accelerator operation amount SL. Thus, a change in the display state of the operation amount display section 10 is consistent with behavior of the accelerator pedal 2. This reduces a sense of something odd felt by the driver.

As illustrated in FIG. 4, when the accelerator operation amount SL is changed in the direction in which the ratio of the operation amount display position to the target display position corresponding to the threshold operation amount Th1 after the variation becomes closer to the ratio of the accelerator operation amount SL to the threshold operation amount Th1 (in a direction in which the peak segment shifts from the ninth segment 10*i* to the eighth segment 10*h*), the display control part 52 (see FIG. 1) shifts the operation amount display position, with a variation in the accelerator operation amount SL smaller than that when the accelerator operation amount SL varies in a direction opposite to the above-described direction.

Note that the opposite direction used herein means, as illustrated in FIG. 6, a direction in which the accelerator operation amount SL varies (a direction in which the peak segment shifts from the ninth segment 10*i* to the tenth segment 10*j*) such that the ratio of the operation amount display position to the target display position corresponding to the threshold operation amount Th1 after the variation becomes farther away from the ratio of the accelerator operation amount SL to the threshold operation amount Th1.

Note that in the state 1 (see FIG. 4), even when the threshold operation amount Th1 varies to become smaller than before, the display state of the accelerator operation amount SL is consistent with that of the operation amount display section 10. Thus, even when the display state of the operation amount display section 10 is changed in accordance with the threshold operation amount Th1, it appears as only an increase or a decrease in the number of the light-emitting increasing reaction force display segments, in which a sense of something odd felt by the driver is small.

Note that even when a variation in the threshold operation amount Th1 coincides with that in the accelerator operation amount SL, the display control part 52 (see FIG. 1) changes the display state of the operation amount display section 10 (see FIG. 1) as illustrated in FIG. 4 and FIG. 6.

Figure 7:
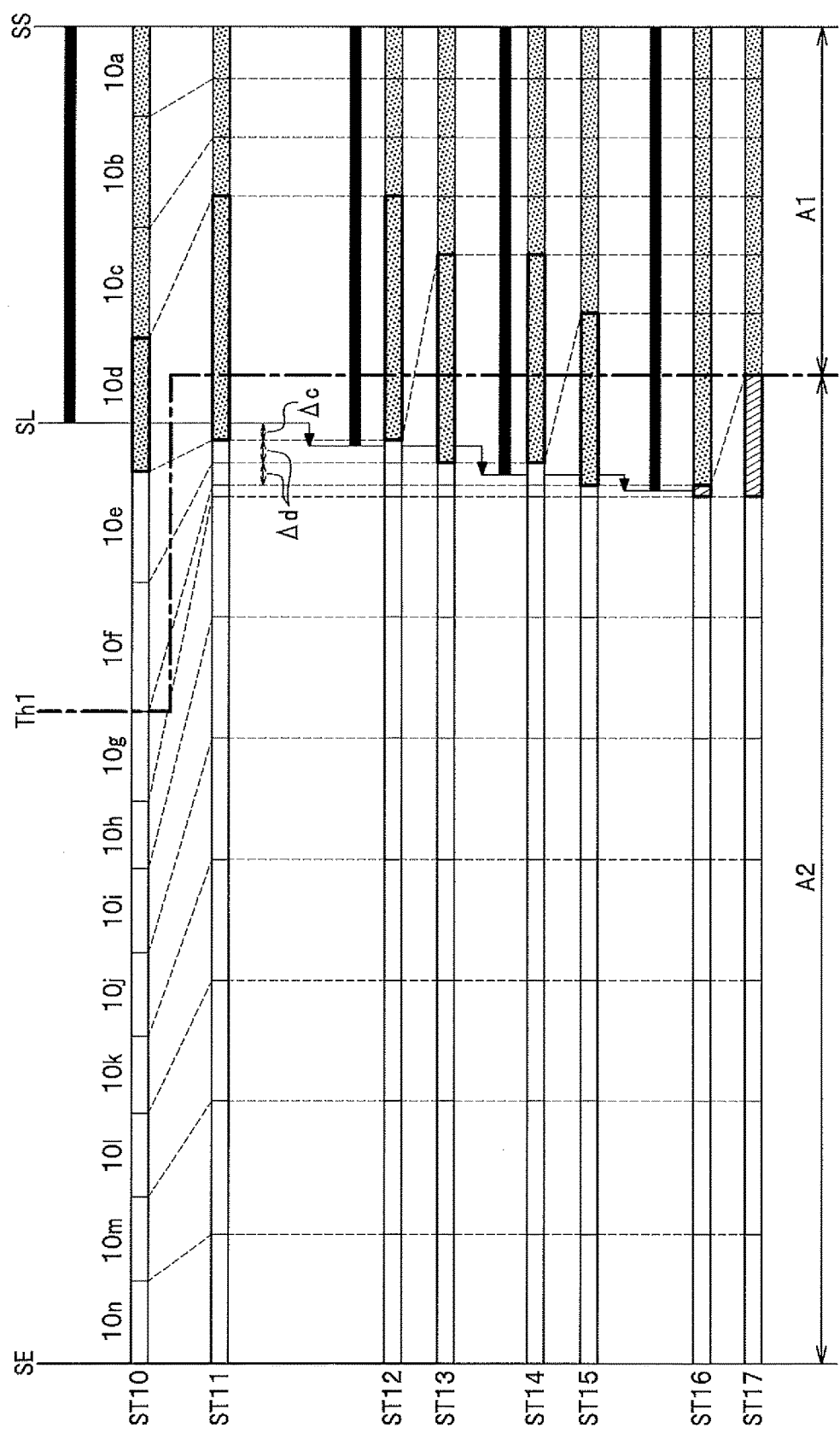
FIG. 7 is a diagram illustrating changes in the display state of the operation amount display section when the accelerator operation amount is smaller than the threshold operation amount, and the threshold operation amount varies to eventually become smaller than the accelerator operation amount, according to the embodiment.

FIG. 7 is a diagram illustrating a change in the display state of the operation amount display section 10 when the accelerator operation amount SL is smaller than the threshold operation amount Th1, and the threshold operation amount Th1 then varies to become smaller than the accelerator operation amount SL.

As illustrated in FIG. 7, let a state 10 (ST10) be a state of the operation amount display section 10, in which: the accelerator operation amount SL is smaller than the threshold operation amount Th1; all of the increasing reaction force display segments stop light emission; and four of the normal reaction force display segments (the first segment 10a to the fourth segment 10d) emit white light. In the state 10, the fourth segment 10d is a peak segment.

When: the operation amount display section 10 is in the state 10; the vehicle speed V decreases; and the threshold operation amount Th1 becomes smaller than the accelerator operation amount SL, the operation amount display section 10 shifts to a state 11 (ST11). When the operation amount display section 10 enters the state 11, the display control part 52 (see FIG. 1) sets an area on the operation starting point SS side of the threshold operation amount Th1, as a new first light emitting area A1. The display control part 52: divides the new first light emitting area A1 into six equal portions; and assigns the six equal portions to respective light emitting areas of the normal reaction force display segments.

The display control part 52 sequentially assigns the light emitting areas of segments (the first segment 10a to the third segment 10c) positioned on the operation starting point SS side of the peak segment (the fourth segment 10d), starting from the operation starting point SS side.

The display control part 52 (see FIG. 1) also assigns an area on the operation end point SE side of the area having been assigned as the light emitting areas of the segments (the first segment 10a to the third segment 10c) on the operation starting point SS side of the peak segment, as a light emitting area of the peak segment (the fourth segment 10d). At this time, the display control part 52 assigns the light emitting area of the peak segment (the fourth segment 10d) as an area even larger than the accelerator operation amount SL.

Note that by how much the light emitting area of the peak segment (the fourth segment 10d) is made to be larger than the accelerator operation amount SL, that is, how large the display control part 52 determines the "Δc" illustrated in FIG. 7 is preferably preset by simulation or the like in advance.

The "Δc" illustrated in FIG. 7 is preferably sufficiently shorter than a length from the accelerator operation amount SL to the third segment 10c. This makes it possible for a light emitting area of the peak segment on a side on which the accelerator operation amount SL varies (on a fifth segment 10e side) in the direction in which the ratio of the operation amount display position to the target display position corresponding to the threshold operation amount Th1 after the variation becomes closer to the ratio of the accelerator operation amount SL to the threshold operation amount Th1, to be set smaller than a light emitting area of the peak segment on a side on which the accelerator operation amount SL varies (on a third segment 10c side) in the opposite direction.

A variation in the accelerator operation amount SL based on which the peak segment is shifted varies in accordance with a variation in the threshold operation amount Th1.

If there is any normal reaction force display segment whose light emission is stopped when the operation amount display section 10 is in the state 10, the display control part 52 (see FIG. 1) assigns an area on the operation end point SE side of the light emitting area of the peak segment, to a light emitting area of the segment of interest. In FIG. 7, the fifth segment 10e and the sixth segment 10f are the segments of interest. The display control part 52 sets a small area as each of the light emitting areas of the segments of interest (the fifth segment 10e and the sixth segment 10f) as small areas. How large the light emitting area of the segment of interest is to be set, that is, how large the display control part 52 sets the "Δd" illustrated in FIG. 7 is preferably preset by simulation or the like in advance.

The display control part 52 also sets an area on the operation end point SE side of the threshold operation amount Th1 after the variation, as a new second light emitting area A2. The display control part 52: divides the newly-set second light emitting area A2 into eight equal portions; and assigns the eight equal portions to respective light emitting areas of the increasing reaction force display segments.

The display control part 52 sequentially assigns the light emitting areas of the fourteenth segment 10n to the seventh segment 10g in this order, from the operation end point SE side. At this time, if there is any area in which the currently assigned light emitting area is overlapped with the having-been-assigned light emitting area of the increasing reaction force display segment, the display control part 52 reduces a size of the light emitting area of the increasing reaction force display segment of interest. This prevents duplication between the light emitting areas of the normal reaction force display segment and the increasing reaction force display segment.

In FIG. 7 illustrated as an example, the light emitting area of the seventh segment 10g is set with a size thereof made smaller.

When the threshold operation amount Th1 varies and thus brings the operation amount display section 10 into the state 11, the light emitting areas of the increasing reaction force display segments and the normal reaction force display segments are assigned as illustrated in FIG. 7. This makes the first segment 10a to the peak segment (the fourth segment 10d) emit light even when the threshold operation amount Th1 varies, unless the accelerator operation amount SL does not vary. In other words, as long as the accelerator operation amount SL remains unchanged, the display state of the operation amount display section 10 does not change.

Let a state 12 (ST12) be a state of the operation amount display section 10, in which the accelerator operation amount SL is increased to a light emitting area of a segment (in FIG. 7, the fifth segment 10e) disposed on the operation end point SE side of the peak segment (the fourth segment 10d).

When the operation amount display section 10 enters the state 12, the display control part 52 (see FIG. 1) changes a size of the light emitting area of the peak segment (the fourth segment 10d) to one sixth of the first light emitting area A1. The display control part 52 extends the light emitting area of the fifth segment 10e toward the operation starting point SE. The display control part 52 makes a segment (the fifth segment 10e) disposed on the operation end point SE of the peak segment emits light. Let a state 13 (ST13) be a state of the operation amount display section 10 as described above. In the state 13, the fifth segment 10e becomes a new peak segment.

Let a state 14 (ST14) be a state of the operation amount display section 10, in which the accelerator operation amount SL is increased up to a light emitting area of a segment (the sixth segment 10f) disposed on the operation end point SE side of the peak segment (the fifth segment 10e).

When the operation amount display section 10 enters the state 14, the display control part 52 (see FIG. 1) changes a size of the light emitting area of the peak segment (the fifth segment 10e) to one sixth of the first light emitting area A1. The display control part 52 extends a light emitting area of the sixth segment 10f toward the operation starting point SS side. The display control part 52 makes a segment (the sixth segment 10f) disposed on the operation end point SE side of the peak segment (the fifth segment 10e) emit light. Let a state 15 (ST15) be a state of the operation amount display section 10 as described above. In the state 15, the sixth segment 10f becomes a new peak segment.

When the accelerator operation amount SL is increased up to a light emitting area of a segment (the seventh segment 10g) disposed on the operation end point SE of the peak segment (the sixth segment 10f), the display control part 52 (see FIG. 1) makes the segment (the seventh segment 10g) disposed on the operation end point SE side of the peak segment (the sixth segment 10f) emit light. Let a state 16 (ST16) be a state of the operation amount display section 10 as described above. In the state 16, the seventh segment 10g becomes a new peak segment.

When the operation amount display section 10 is in the state 16, the accelerator operation amount SL is larger than the threshold operation amount Th1, and one or more appropriate increasing reaction force display segments emit light. This means that when the operation amount display section 10 enters the state 16, the accelerator operation amount SL and the operation amount display section 10 have same display states.

When the operation amount display section 10 enters the state 16, the display control part 52 (see FIG. 1) sets the having-been-reduced light emitting area of the seventh segment 10g, in one of the equally divided eight portions of the new second light emitting area A2. That is, the display control part 52 changes a size of the light emitting area of the peak segment (the sixth segment 10f) in the state 5, to one sixth of the first light emitting area A1.

Let a state 17 (ST17) be a state of the operation amount display section 10 as described above.

In this embodiment, when the operation amount display section 10 is in the state 17, as illustrated at the ST17 in FIG. 7, the first segment 10a to the seventh segment 10g emit light, and the seventh segment 10g to the fourteenth segment 10n stop light emission. In the state 17, the seventh segment 10g becomes a peak segment.

Figure 8A:
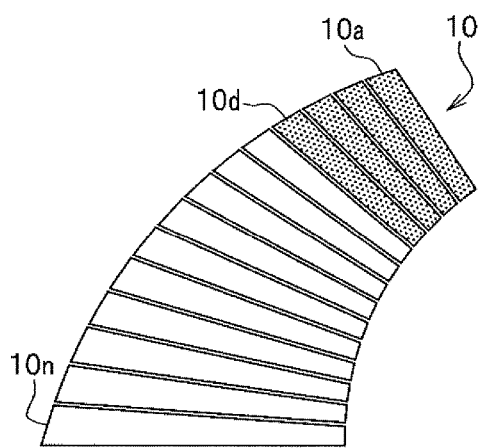
FIGS. 8A to 8D are diagrams illustrating the display states of the operation amount display section in states 10 to 17, according to the embodiment.
Figure 8C:
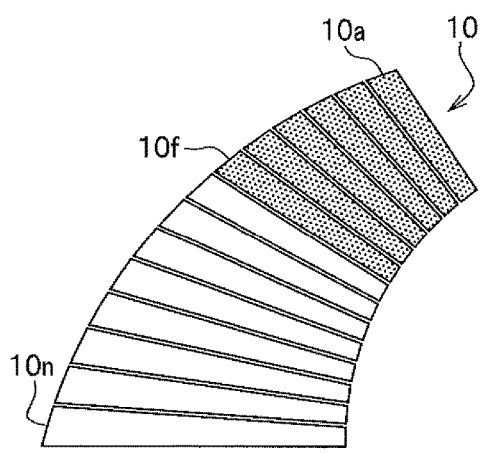
Figure 8B:
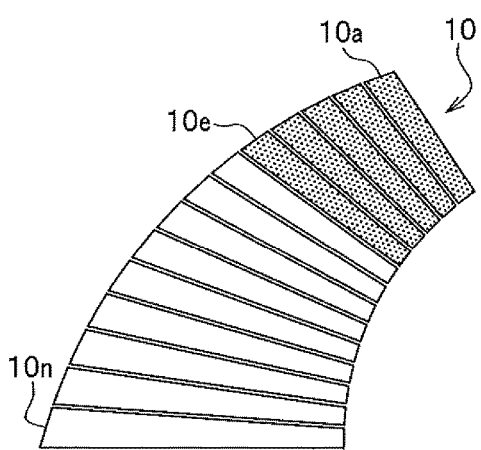
Figure 8D:
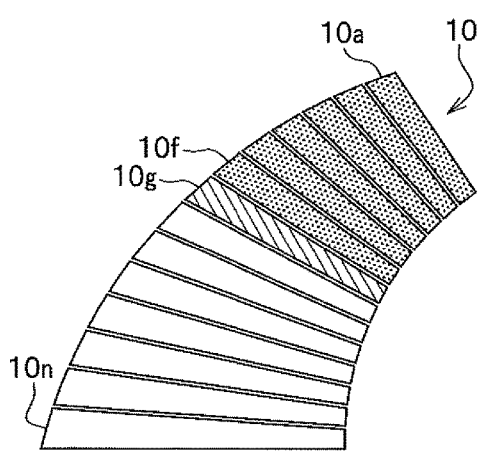

FIGS. 8A to 8D are diagrams illustrating display states of the operation amount display section in the states 10 to 17. FIG. 8A is a diagram illustrating the display state of the operation amount display section in the states 10 to 12. FIG. 8B is a diagram illustrating the display state of the operation amount display section in the states 13 and 14. FIG. 8C is a diagram illustrating the display state of the operation amount display section in the state 15. FIG. 8D is a diagram illustrating the display state of the operation amount display section in the states 16 and 17. The state 10 (ST10) to state 17 (ST17) illustrated in FIGS. 8A to 8D correspond to the state 10 to the state 17 illustrated in FIG. 7, respectively.

When the operation amount display section 10 is in the state 10 (ST10), as illustrated in FIG. 8A, all of the increasing reaction force display segments stop light emission, and four of the normal reaction force display segments (the first segment 10a to the fourth segment 10d) emit white light.

When the threshold operation amount Th1 is decreased to eventually become smaller than the accelerator operation amount SL, the operation amount display section 10 shifts to the state 11 (ST11). In the state 11, even when the accelerator operation amount SL becomes larger than the threshold operation amount Th1, the display state of the operation amount display section 10 remains unchanged.

When the operation amount display section 10 is in the state 12 (ST12), the display control part 52 (see FIG. 1) makes the fifth segment 10e emit light and shifts the operation amount display section 10 to the state 13. Therefore, when the operation amount display section 10 is in the state 13, as illustrated in FIG. 8B, all of the increasing reaction force display segments stop light emission, and five of the normal reaction force display segments (the first segment 10a to the fifth segment 10e) emit white light.

If the accelerator operation amount SL is increased when the operation amount display section 10 is in the state 13, the operation amount display section 10 enters the state 14 (ST14). In the state 14, even when the accelerator operation amount SL is increased, the display state of the operation amount display section 10 remains unchanged.

When the operation amount display section 10 is in the state 14 (ST14), the display control part 52 (see FIG. 1) makes the sixth segment 10f emit light and shifts the operation amount display section 10 in the state 15 (ST15). Therefore, when the operation amount display section 10 enters the state 15, as illustrated in FIG. 8C, all of the increasing reaction force display segments stop light emission, and all of the normal reaction force display segments (the first segment 10a to the sixth segment 10f) emit white light.

When the operation amount display section 10 is in the state 15 and the accelerator operation amount SL is increased to eventually shift the operation amount display section 10 to the state 16 (ST16), the display control part 52 (see FIG. 1) makes the seventh segment 10g emit blue light. Therefore, as illustrated in FIG. 8D, all of the normal reaction force display segments emit white light, and one of the increasing reaction force display segments (the seventh segment 10g) emits blue light.

When the operation amount display section 10 is in the state 16, the display control part 52 (see FIG. 1): assigns an area from the operation starting point SS to the threshold operation amount Th1 to a first light emitting area A1; and also assigns an area from the threshold operation amount Th1 to the operation end point SE to a second light emitting area A2. This makes the operation amount display section 10 shift to the state 17 (ST17). The display control part 52 makes one or more of the increasing reaction force display segments emit light in accordance with the accelerator operation amount SL. In FIG. 7 illustrated as the example, when the operation amount display section 10 is in the state 17, as illustrated in FIG. 8D, one increasing reaction force display segment (the seventh segment 10g) emits blue light.

When the operation amount display section 10 shifts from the state 14 through the state 17, the driver recognizes the change in the display state as if the number of the segments which emit light in response to an operation of the accelerator pedal 2 is increased. As for the driver, the display state of the operation amount display section 10 is consistent with the behavior of the accelerator pedal 2. This can reduce a sense of something odd felt by the driver.

When the threshold operation amount Th1 varies as illustrated in FIG. 7, the threshold operation amount Th1 after the variation is smaller than the accelerator operation amount SL, and the threshold operation amount Th1 before the variation is larger than the accelerator operation amount SL. Therefore, the ratio of the operation amount display position to the target display position corresponding to the threshold operation amount Th1 after the variation is larger than the ratio of the accelerator operation amount SL to the threshold operation amount Th1.

In this case, as illustrated in FIG. 7, in which the accelerator operation amount SL is increased, and thus, the ratio of the operation amount display position to the target display position corresponding to the threshold operation amount Th1 after the variation varies in the direction closer to the ratio of the accelerator operation amount SL to the threshold operation amount Th1, the display control part 52 shifts the peak segment from the fourth segment 10d to the fifth segment 10e (from the state 11 to the state 13), with a variation smaller than that when the accelerator operation amount SL is reduced. That is, when the accelerator operation amount SL varies in the direction closer to the ratio of the accelerator operation amount SL to the threshold operation amount Th1, the display control part 52 sets a light emission area of a segment as the peak segment (in FIG. 7 illustrated as the example, the fourth segment 10d) such that the accelerator operation amount SL is not included within the light emitting area of the peak segment, with a variation smaller than that when the accelerator operation amount SL varies in the opposite direction.

When the accelerator operation amount SL is equal to the threshold operation amount Th1, the display control part 52 makes all of the normal reaction force display segments emit light and also makes all of the increasing reaction force display segments stop light emission thereof. That is, the display control part 52 makes the ratio of the operation amount display position to the target display position corresponding to the threshold operation amount Th1 after the variation, closer to the ratio of the accelerator operation amount SL to the threshold operation amount Th1.

Figure 9:
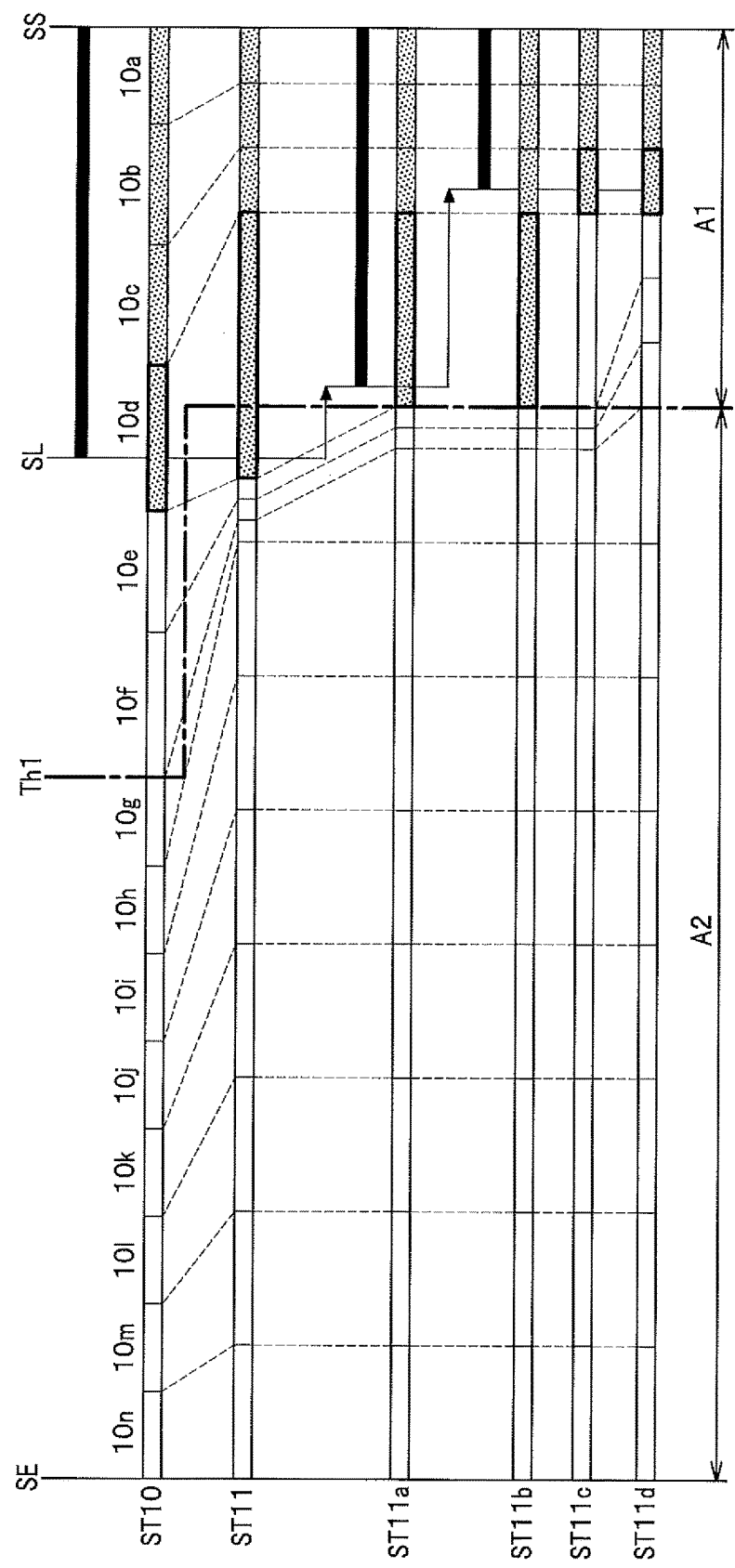
FIG. 9 is a diagram illustrating a change in the display state of the operation amount display section when the accelerator operation amount is decreased from the state 11, according to the embodiment.

FIG. 9 is a diagram illustrating a change in the display state of the operation amount display section 10 when the accelerator operation amount is decreased from the state 11.

As illustrated in FIG. 9, Let a state 11a (ST11a) be a state of the operation amount display section 10, in which the accelerator operation amount SL is decreased within a range of the light emitting area of the peak segment (the fourth segment 10d) in the state 11. In this case, the display control part 52 shifts the operation starting point SS side of the light emitting area of the peak segment (the fourth segment 10d) to the operation end point SE side in accordance with a variation in the accelerator operation amount SL. The light emitting area of the peak segment (the fourth segment 10d) is thus kept larger than the accelerator operation amount SL by the "Δc". This allows the accelerator operation amount SL based on which the peak segment is shifted to vary in accordance with the accelerator operation amount SL.

The display control part 52 shifts the light emitting area having been assigned in a size of a "Δd" on the operation end point SE side of the light emitting area of the peak segment (the light emitting areas of the fifth segment 10e and the sixth segment 10f), to the operation starting point SS side in accordance with the light emitting area of the peak segment. The display control part 52 also extends the having been reduced light emitting area of the increasing reaction force display segment (in FIG. 9 illustrated as the example, the light emitting area of the seventh segment 10g) to the operation starting point SS side within a range within which the light emitting area of the increasing normal reaction force display segment is not overlapped with that of the normal reaction force display segment.

Let a state 11b (ST11b) be a state of the operation amount display section 10, in which the accelerator operation amount SL is further reduced up to a light emitting area of a segment (the third segment 10c) disposed on the operation starting point SS side of the peak segment (the fourth segment 10d) in the state 11a. When the operation amount display section 10 is in the state 11b, the display control part 52 (see FIG. 1): stops light emission of the peak segment (the fourth segment 10d); and determines the third segment 10c as a new peak segment. Let a state 11c (ST11c) be a state of the operation amount display section 10 as described above.

When the operation amount display section 10 is in the state 11c, the display control part 52 (see FIG. 1): assigns the normal reaction force display segments (the first segment 10a to the sixth segment 10f) as a first light emitting area A1; and also assigns the increasing reaction force display segments (the seventh segment 10g to the fourteenth segment 10n) as a second light emitting area A2. Let a state 11d (ST11d) be a state of the operation amount display section 10 as described above. The state 11d is a state same as the state 17 illustrated in FIG. 7. In the state 11d, the six normal reaction force display segments (the first segment 10a to the sixth segment 10f) emit light in accordance with the accelerator operation amount SL varying from the operation starting point SS to the threshold operation amount Th1. In the state 11d, the eight increasing reaction force display segments (the seventh segment 10g to the fourteenth segment 10n) emit light in accordance with the accelerator operation amount SL varying from the threshold operation amount Th1 to the operation end point SE. Thus, when the accelerator operation amount SL is larger than the threshold operation amount Th1, an appropriate number of the increasing reaction force display segments emit light. When the accelerator operation amount SL is smaller than the threshold operation amount Th1, the increasing reaction force display segments emit no light.

As described above, even when the accelerator operation amount SL is decreased, the display state of the operation amount display section 10 is also changed along with the decrease in the accelerator operation amount SL. Thus, a change in the display state of the operation amount display section 10 is consistent with the behavior of the accelerator pedal 2. This can reduce a sense of something odd felt by the driver.

As illustrated in FIG. 7, when the accelerator operation amount SL varies in the direction in which the ratio of the operation amount display position to the target display position corresponding to the threshold operation amount Th1 after the variation becomes closer to the ratio of the accelerator operation amount SL to the threshold operation amount Th1 (in a direction in which the peak segment shifts from the fourth segment 10d to the fifth segment 10e), the display control part 52 (see FIG. 1) shifts the operation amount display position with a variation in the accelerator operation amount SL smaller than that when the accelerator operation amount SL varies in a direction opposite to the above-described direction.

Note that the opposite direction used herein means, as illustrated in FIG. 9, a direction in which the accelerator operation amount SL varies (a direction in which the peak segment shifts from the fourth segment 10d to the third segment 10c) such that the ratio of the operation amount display position to the target display position corresponding to the threshold operation amount Th1 after the variation becomes farther away from the ratio of the accelerator operation amount SL to the threshold operation amount Th1.

Note that in the state 10 illustrated in FIG. 7, even when the threshold operation amount Th1 varies to eventually become larger than before, the display state of the accelerator operation amount SL is still consistent with that of the operation amount display section 10. Thus, even when the display state of the operation amount display section 10 is changed in accordance with the threshold operation amount Th1, it appears as only an increase or a decrease in the number of the light-emitting normal reaction force display segments, in which a sense of something odd felt by the driver is small.

As described above, in the pedal operation amount display apparatus 9 illustrated in FIG. 1 according to this embodiment, the increasing reaction force display segment of the operation amount display section 10 emits light, when the accelerator operation amount SL exceeds the threshold operation amount Th1.

Even when the threshold operation amount Th1 varies in response to a change in the vehicle speed V, the display state of the operation amount display section 10 does not change until the accelerator operation amount SL varies. That is, even when the threshold operation amount Th1 varies, the operation amount display position (a position of a segment which emits light) does not change until the accelerator operation amount SL varies.

When the accelerator operation amount SL varies, the display state of the operation amount display section 10 changes so as to be consistent with the accelerator operation amount SL.

In other words, when the driver keeps on depressing the accelerator pedal 2 in a constant operation amount, even if the threshold operation amount Th1 varies, the display state of the operation amount display section 10 remains unchanged. Meanwhile, when the driver changes the operation amount of depressing the accelerator pedal 2, the display state of the operation amount display section 10 changes such that the changed operation amount is consistent with the accelerator operation amount SL. Therefore, the change in the display state of the operation amount display section 10 is consistent with behavior of the accelerator pedal 2. This can reduce a sense of something odd felt by the driver.

The present invention is not limited to the embodiment described above, and various design changes are possible within a scope not departing from the gist of the present invention.

For example, the number of the normal reaction force display segments or the number of the increasing reaction force display segments is not specifically limited and can be set as appropriate.

Arrangement of the normal reaction force display segments or the increasing reaction force display segments is not specifically limited to the arc-like arrangement as illustrated in FIG. 1. The segments may be arranged, for example, in a horizontal straight line.

In place of the light-emitting segments, the display device 1 may be constituted by, for example, bars whose extension or contraction indicates the accelerator operation amount SL, or needles of meter type whose operation indicates the accelerator operation amount SL. Or, the display device 1 may numerically (digitally) indicate the accelerator operation amount SL.

Of a plurality of the segments, only the peak segment may emit light. That is, the pedal operation amount display apparatus 9 may indicate a variation in the accelerator operation amount SL by a shift of the peak segment.

Where to dispose the display device 1 is not limited to be near the speedometer 70. For example, the display device 1 may be constituted by a display in which the normal reaction force display segments or the increasing reaction force display segments are displayed as character displays of a navigation system not shown.

Or, the display device 1 may be constituted by a head-up display in which the normal reaction force display segments or the increasing reaction force display segments are projected on a front window thereof or the like.

Note that in this embodiment, the assist reaction force calculation part 50 (see FIG. 1) calculates the applied reaction force Pa based on the vehicle speed V. The assist reaction force calculation part 50 may calculate the applied reaction force Pa, however, based on a factor other than the vehicle speed V. For example, the assist reaction force calculation part 50 may calculate the applied reaction force Pa, when the assist reaction force calculation part 50 detects a slip of a vehicle (not shown) or avoids collision. Or, the assist reaction force calculation part 50 may calculate the applied reaction force Pa, when the assist reaction force calculation part 50 assists cornering or eco-driving (fuel-efficient driving).

REFERENCE SINGS LIST 1 display device (information display device)
2 accelerator pedal (operator)
4 reaction force generator (reaction force applicator)
9 pedal operation amount display apparatus (operation amount display apparatus)
50 assist reaction force calculation part (setting part)
52 display control part (information display part)
SE operation end point
SL accelerator operation amount (operation amount)
SS operation starting point

The invention claimed is:

1. An operation amount display apparatus, comprising:
   an information display part that is configured to display an accelerator operation amount of an accelerator pedal by an operating person; and
   a setting part that is configured to set a target value of the accelerator operation amount,
   wherein the information display part sets a prescribed target display position which indicates the target value, converts the accelerator operation amount into an operation amount display position, and variably displays the operation amount display position, using the target display position as a reference, and
   wherein, when the target value is changed, the information display part keeps the operation amount display position unchanged until the accelerator operation amount is changed.

2. The operation amount display apparatus according to claim 1,
   wherein, when the target value is changed and the accelerator operation amount is then also changed, the information display part converts the accelerator operation amount into the operation amount display position such that a ratio of the operation amount display position to the target display position becomes closer to a ratio of the accelerator operation amount to the target value.

3. The operation amount display apparatus according to claim 2, wherein, when the target value is changed and the accelerator operation amount is then also changed, and also when the accelerator operation amount varies in a direction in which the ratio of the operation amount display position to the target display position becomes closer to the ratio of the accelerator operation amount to the target value, the information display part changes the operation amount display position, with a variation in the accelerator operation amount smaller than that when the accelerator operation amount varies in a direction opposite to the direction.

4. The operation amount display apparatus according to claim 3,
wherein the accelerator pedal is an accelerator pedal to which an applied reaction force generated by a reaction force applicator is applied, to thereby increase a pedal reaction force,
wherein the setting part sets an accelerator operation amount when the pedal reaction force is increased by the applied reaction force generated by the reaction force applicator, as the target value, and
wherein, when the accelerator operation amount exceeds the target value, the information display part displays force application information which is information including that the accelerator operation amount has exceeded the target value.

5. The operation amount display apparatus according claim 3,
wherein, the information display part
displays the accelerator operation amount in a form of a plurality of segments obtained by dividing the accelerator operation amount,
shifts a peak segment in accordance with a variation in the accelerator operation amount, the peak segment being one of a plurality of the segments and indicating the operation amount display position, and
changes a variation in the accelerator operation amount based on which the peak segment is shifted, in response to at least one of a change in the target value and a variation in the accelerator operation amount.

6. The operation amount display apparatus according to claim 2,
wherein the accelerator pedal is an accelerator pedal to which an applied reaction force generated by a reaction force applicator is applied, to thereby increase a pedal reaction force,
wherein the setting part sets an accelerator operation amount when the pedal reaction force is increased by the applied reaction force generated by the reaction force applicator, as the target value, and
wherein, when the accelerator operation amount exceeds the target value, the information display part displays force application information which is information including that the accelerator operation amount has exceeded the target value.

7. The operation amount display apparatus according to claim 2,
wherein, the information display part
displays the accelerator operation amount in a form of a plurality of segments obtained by dividing the accelerator operation amount,
shifts a peak segment in accordance with a variation in the accelerator operation amount, the peak segment being one of a plurality of the segments and indicating the operation amount display position, and
changes a variation in the accelerator operation amount based on which the peak segment is shifted, in response to at least one of a change in the target value and a variation in the accelerator operation amount.

8. The operation amount display apparatus according to claim 1,
wherein, the information display part
displays the accelerator operation amount in a form of a plurality of segments obtained by dividing the accelerator operation amount,
shifts a peak segment in accordance with a variation in the accelerator operation amount, the peak segment being one of a plurality of the segments and indicating the operation amount display position, and
changes a variation in the accelerator operation amount based on which the peak segment is shifted, in response to at least one of a change in the target value and a variation in the accelerator operation amount.

9. The operation amount display apparatus according to claim 8, wherein, when the target value is changed, and also when the accelerator operation amount varies in a direction in which the ratio of the operation amount display position to the target display position becomes closer to the ratio of the accelerator operation amount to the target value, the information display part shifts the peak segment, with a variation in the accelerator operation amount smaller than that when the accelerator operation amount varies in a direction opposite to the direction.

10. The operation amount display apparatus according to claim 9,
wherein the information display part
divides a total accelerator operation amount in a range in which the accelerator operation amount of the accelerator pedal varies from an operation starting point to an operation end point, into small divisions in the number as many as that of a plurality of the segments, and assigns display areas of a plurality of the segments to the respective small divisions,
sets the segment corresponding to the small division which is assigned on a side closest to the operation end point, from among one or more of the small divisions constituting the accelerator operation amount, as the peak segment, and,
when the target value is changed, and also when the accelerator operation amount varies in the direction in which the ratio of the operation amount display position to the target display position becomes closer to the ratio of the accelerator operation amount to the target value, assigns the display area of the peak segment such that the accelerator operation amount is not included within the display area of the peak segment, with a variation in the accelerator operation amount smaller than that when the accelerator operation amount varies in the opposite direction.

11. The operation amount display apparatus according to claim 10,
wherein the accelerator pedal is an accelerator pedal to which an applied reaction force generated by a reaction force applicator is applied, to thereby increase a pedal reaction force,
wherein the setting part sets an accelerator operation amount when the pedal reaction force is increased by the applied reaction force generated by the reaction force applicator, as the target value, and
wherein, when the accelerator operation amount exceeds the target value, the information display part displays force application information which is information including that the accelerator operation amount has exceeded the target value.

12. The operation amount display apparatus according to claim 9,
- wherein the accelerator pedal is an accelerator pedal to which an applied reaction force generated by a reaction force applicator is applied, to thereby increase a pedal reaction force,
- wherein the setting part sets an accelerator operation amount when the pedal reaction force is increased by the applied reaction force generated by the reaction force applicator, as the target value, and
- wherein, when the accelerator operation amount exceeds the target value, the information display part displays force application information which is information including that the accelerator operation amount has exceeded the target value.

13. The operation amount display apparatus according to claim 8,
- wherein the accelerator pedal is an accelerator pedal to which an applied reaction force generated by a reaction force applicator is applied, to thereby increase a pedal reaction force,
- wherein the setting part sets an accelerator operation amount when the pedal reaction force is increased by the applied reaction force generated by the reaction force applicator, as the target value, and
- wherein, when the accelerator operation amount exceeds the target value, the information display part displays force application information which is information including that the accelerator operation amount has exceeded the target value.

14. The operation amount display apparatus according to claim 1,
- wherein the accelerator pedal is an accelerator pedal to which an applied reaction force generated by a reaction force applicator is applied, to thereby increase a pedal reaction force,
- wherein the setting part sets an accelerator operation amount when the pedal reaction force is increased by the applied reaction force generated by the reaction force applicator, as the target value, and
- wherein, when the accelerator operation amount exceeds the target value, the information display part displays force application information which is information including that the accelerator operation amount has exceeded the target value.

* * * * *